United States Patent [19]

Switlik

[11] Patent Number: 5,498,059
[45] Date of Patent: Mar. 12, 1996

[54] APPARATUS FOR DEDUCING DRAG

[76] Inventor: Stanley Switlik, 33 E. Welling Ave., Pennington, N.J. 08534

[21] Appl. No.: 314,020

[22] Filed: Sep. 28, 1994

[51] Int. Cl.⁶ .................................................. B62D 35/00
[52] U.S. Cl. ................................. 296/180.1; 296/180.4
[58] Field of Search ........................... 296/180.1, 180.4, 296/180.5, 91; 180/903; 105/1.1, 1.3

[56] References Cited

U.S. PATENT DOCUMENTS

| | | |
|---|---|---|
| 1,923,349 | 8/1933 | Wolverton . |
| 2,146,297 | 2/1939 | Huet . |
| 2,569,983 | 10/1951 | Favre . |
| 3,010,754 | 11/1961 | Shumaker . |
| 3,741,285 | 6/1973 | Kuethe . |
| 3,776,363 | 12/1973 | Kuethe . |
| 3,971,586 | 7/1976 | Saunders ................................ 296/91 X |
| 3,999,797 | 12/1976 | Kirsch et al. ........................ 244/130 X |
| 4,068,883 | 1/1978 | Meinecke et al. ..................... 296/91 X |
| 4,195,874 | 4/1980 | Janssen et al. ......................... 296/91 X |
| 4,214,787 | 7/1980 | Chain . |
| 4,257,640 | 3/1981 | Wiley . |
| 4,257,641 | 3/1981 | Keedy ..................................... 296/91 X |
| 4,433,865 | 2/1984 | Crompton, Jr. ........................ 296/91 X |
| 4,451,074 | 5/1984 | Scanton . |
| 4,457,550 | 7/1984 | Gielow et al. ......................... 296/91 X |
| 4,486,046 | 12/1984 | Whitney et al. . |
| 4,508,380 | 4/1985 | Sankrithi ..................... 296/27 |
| 4,553,781 | 11/1985 | Johnson . |
| 4,601,508 | 7/1986 | Kerian . |
| 4,640,541 | 2/1987 | Fitzgerald et al. . |
| 4,682,808 | 7/1987 | Bilanin ................................. 296/91 X |
| 4,688,841 | 8/1987 | Moore ................................. 296/180.4 |
| 4,702,509 | 10/1987 | Elliott, Sr. . |
| 4,818,015 | 4/1989 | Scanlon ............................... 296/180.1 |
| 4,978,162 | 12/1990 | Labbé ................................... 290/180.2 |
| 5,058,945 | 10/1991 | Elliott, Sr. et al. .................. 296/180.5 |
| 5,171,057 | 12/1992 | Sharp .................................... 296/180.4 |
| 5,234,248 | 8/1993 | Bosh ........................................ 296/91 |
| 5,236,347 | 8/1993 | Andrus ................................. 296/180.4 |
| 5,240,306 | 8/1993 | Flemming ............................ 296/180.4 |
| 5,280,990 | 1/1994 | Rinard .................................. 296/180.1 |
| 5,332,280 | 7/1994 | DuPont ................................ 296/180.1 |
| 5,348,366 | 9/1994 | Baker et al. ........................ 296/180.4 |
| 5,352,008 | 10/1994 | Denvir ...................................... 296/50 |
| 5,375,903 | 12/1994 | Lechner ............................... 296/180.1 |

FOREIGN PATENT DOCUMENTS

| | | |
|---|---|---|
| 1079772 | 6/1980 | Canada . |
| 556883 | 7/1923 | France . |
| 2366979 | 5/1978 | France . |
| 150582 | 9/1981 | German Dem. Rep. . |
| 2003230 | 4/1983 | German Dem. Rep. . |
| 823209 | 4/1981 | U.S.S.R. .............................. 296/180.4 |
| 1759715 | 9/1992 | U.S.S.R. .............................. 296/180.5 |

*Primary Examiner*—Dennis H. Pedder
*Attorney, Agent, or Firm*—Sperry, Zoda & Kane

[57] ABSTRACT

An improved apparatus for reducing the drag of a moving body at the trailing end thereof by positioning panels extendable rearwardly from the trailing end of the moving body to minimize drag wherein deployment of the rearwardly extending panels is facilitated such as by allowing for automatic deployment of an upper horizontal panel responsive to conventional deployment of one or more vertically extending panels at forming the upper panel in a frame construction covered by flexible material. The upper panel can be spring loaded to further facilitate deployment and the lower horizontal panel can be easily deployed and possibly stored with respect to one of the vertically extending panels. Use of the frame configuration for deploying the upper horizontal panel also facilitates movement from the deployed to the stored position such as by including release cords preferably secured at one end with respect to the vertically movable preferably trapezoidally shaped frame. Two such horizontal panels with separate frames can be utilized to achieve full deployment of a horizontal panel across the lateral dimension of the trailing end of such a moving vehicle. Several novel configurations for deployment of a lower horizontal panel are also included herein. Also two similar horizontal foldable sections can be used to form the lowermost horizontal panel to form a completely automatic deployable device.

57 Claims, 9 Drawing Sheets

5,498,059

APPARATUS FOR DEDUCING DRAG

BACKGROUND OF THE INVENTION

1. Field of the Invention

The present invention deals with the field of devices for reducing the aerodynamic drag of a moving body, such as a vehicle, truck or trailer body, as it travels through air whereby the dynamic characteristics of the fluid air can exert a significant amount of drag force particularly in the area adjacent the rear of such a moving body. These drag forces are especially significant when the trailing end of the moving body has large planar surfaces which are perpendicular to the direction of movement of the body thereby presenting a fairly blunt surface facing rearwardly.

The general classification of the apparatus of the present invention includes any auxiliary structure designed to be attached to a moving body to reduce aerodynamic drag forces exerted thereon during movement through air. Such added structures are adapted to be positioned extending along various surfaces of a vehicle while moving to enhance the aerodynamic characteristics thereof. Various types of air foils or deflector panels have been utilized for this specific purpose in order to increase vehicle speed and, most particularly in recent years, lower the fuel costs for propelling a body such as a truck or truck and trailer along the highway at a given speed. These air flow control devices normally are attached to the rear portion of a truck, trailer, van or any other generally blunt shaped bodies in such a manner as to be create a good air seal between the aerodynamic panels and the moving body in order to enhance the aerodynamic advantages thereof. The configuration of the present invention provides a novel structure attachable to the rear of a moving body for reducing aerodynamic drag which is easily deployed to significantly encourage usage.

The present invention includes one embodiment where fully automatic deployment is possible. With this configuration, the operator only need deploy the two vertically extending panel to deploy the entire drag reducing apparatus. The deployment of these two vertical panels can be performed manually or by remote or any otherwise powered means. Also the apparatus of the present invention include certain embodiments which are fully usable with trucks or trailers having vertically extending locking bars which have heretofore been rendered unworkable or of limited function by attachment of a drag reducing apparatus to the rear of such vehicles or trailers.

2. Description of the Prior Art

Numerous designs have been utilized and patented for reducing drag on moving vehicles most of which are usable with respect to larger commercial trucks and trailers. With these types of moving bodies the aerodynamic drag problem is particularly significant and the number of miles driven per year is large thereby greatly increasing the cost savings achievable in fuel consumption. Examples of such patents for reducing vehicle drag are shown in U.S. Pat. No. 4,682,808 patented Jul. 28, 1987 to A. Bilanin on a "Vehicle Drag Reducer"; and U.S. Pat. No. 1,923,349 patented Aug. 22, 1933 to P. B. Wolverton on a "Vacuum Breaker"; and U.S. Pat. No. 2,146,297 patented Feb. 7, 1939 to A. Huet on a "Wind Deflector And Brake"; and U.S. Pat. No. 2,569,983 patented Oct. 2, 1951 to A. Favre on an "Aircraft Wing Flap With A Leading Edge Roller"; and U.S. Pat. No. 3,010,754 patented Nov. 28, 1961 to H. W. Shumaker on a "Rear End Wind Deflector For Vehicles"; and U.S. Pat. No. 3,741,285 patented Jun. 26, 1973 to A. Kuethe on a "Boundary Layer Control Of Flow Separation And Heat Exchange"; and U.S. Pat. No. 3,776,363 patented Dec. 4, 1973 to A. Kuethe on a "Control Of Noise And Instabilities In Jet Engines, Compressors, Turbines, Heat Exchangers And The Like"; and U.S. Pat. No. 3,971,586 patented Jul. 27, 1976 to W. Saunders on a "Drag Reducer For Land Vehicles"; and U.S. Pat. No. 3,999,797 patented Dec. 28, 1976 to J. Kirsch et al and assigned to Systems, Science and Software on an "Airvane Device For Bluff Vehicles And The Like"; and U.S. Pat. No. 4,068,883 patented Jan. 17, 1978 to S. Meinecke et al and assigned to Walter Selden Saunders on a "Wind Deflector Configuration"; and U.S. Pat. No. 4,195,874 patented Apr. 1, 1980 to L. Janssen et al and assigned to Volkswagenwerk Aktiengesellschaft on a "Vehicle Rear Window Arrangement"; and U.S. Pat. No. 4,214,787 patented Jul. 29, 1980 to F. Chain on a "Drag Reducing Apparatus"; and U.S. Pat. No. 4,257,640 patented Mar. 24, 1981 to N. Wiley and assigned to Rudkin-Wiley Corporation on a "Drag Reducer For Land Vehicles"; and U.S. Pat. No. 4,257,641 patented Mar. 24, 1981 to E. Keedy on a "Vehicle Drag Reducer"; and U.S. Pat. No. 4,433,865 patented Feb. 28, 1984 to E. Crompton, Jr. on a "Vehicle Sway Damper"; and U.S. Pat. No. 4,451,074 patented May 29, 1984 to B. Scanlon on "Vehicular Airfoils"; and U.S. Pat. No. 4,508,380 patented Apr. 2, 1985 to M. Sankrithi on a "Truck Afterbody Drag Reducing Device"; and Canadian Patent No. 1079772 patented Jun. 17, 1980 on an "Air Flow Deflector For Use At The Rear Of Heavy Vehicles"; and French Patent No. 556,883; and French Patent No. 76 30042; and German Patent No. 150582; and German Patent No. 200323.

SUMMARY OF THE INVENTION

The present invention provides an improved apparatus for reducing aerodynamic drag at the trailing edge of a moving body such as a truck or trailer which include two side surfaces and a top surface as well as a trailing end and a lower or frame surface. The apparatus includes a first vertical panel and a second vertical panel both pivotally attached with respect to the trailing end of the moving body and extending rearwardly therefrom in a deployed orientation. These two panels preferably extend approximately parallel to the two adjacent side surfaces with the first vertical panel adjacent the left side surface and the second vertical panel adjacent the right side surface as shown best in FIG. 5.

Both the first and the second vertical panels are pivotally movable between a collapsed position adjacent to the rear or trailing end of the moving body and a deployed position extending rearwardly generally parallel to the side surfaces.

The present invention further includes a first horizontal panel which is pivotally attached with respect to the trailing end of the body and is also movable from a collapsed position thereagainst to a deployed position extending rearwardly therefrom generally parallel to the top surface of the moving body. This first horizontal panel will then define therebelow a dead space area which is positioned between the first and second vertically extending panels. This dead space area will provide a low pressure area behind the moving body to improve the aerodynamic characteristics thereof. The horizontal panel is constructed to facilitate deployment thereof simultaneously with deployment of the two vertically extending panels.

The configuration of the first horizontal panel may include a first frame pivotally mounted with respect to the trailing end of the body. This first frame will assume the general shape of a trapezoid to facilitate deployment. This first frame includes a first inner rib pivotally attached with respect to the trailing end of the body and extending outwardly therefrom to a deployed position at which it is approximately perpendicular to the trailing end of the moving body. Also the first frame includes a first outer rib pivotally attached with respect to the trailing end of the body and spatially disposed from the first inner rib. This first outer rib is pivotable outwardly to a deployed position angularly oriented with respect to the trailing end of the body and is angled toward the first inner rib preferably at an angle of approximately 45 degrees with respect to the first vertically extending panel. The angular line of the outer rib preferable is aligned with the pivot point of the adjacent vertical panel. A first cross strut will be integral with respect to both the first inner rib and the first outer rib and will extend outwardly therefrom and be approximately parallel with respect to the trailing end of the moving body. With this configuration a partial frame will be constructed when deployed wherein the first inner rib will extend rearwardly perpendicular to the rear surface and the first cross strut will extend laterally horizontally therefrom and the first outer rib will extend inwardly toward the trailing edge of the body member to form a movable trapezoidally shaped frame to facilitate deployment of the first horizontal panel. The first inner rib, the first cross strut and a first outer rib will all preferably be integrally formed together preferably of a metallic rod or tube shaped material or other suitable stiff material.

To facilitate movement of the first frame means to the deployed position a first pivot spring biasing means is preferably connected with respect to the first inner rib to urge movement thereof to the deployed position. In a similar manner a first outer spring biasing means will be connected with respect to the first outer rib means to facilitate and urge movement thereon to the deployed position. Also a spring device can be positioned between the first link arm and the first frame to urge movement thereof to the deployed position. These three spring means may all be used together or individually and they all tend to urge the first frame means to move to the horizontally extending position for full deployment of the first horizontal panel.

A first mounting arm may be, but not necessarily need be, integral with respect to the first inner rib and a first outer rib and be pivotally mounted with respect to the trailing end of the body in order to facilitate movement of the first frame with respect thereto. This first mounting arm preferably includes an inside first mounting section and an outside first mounting section spatially disposed from one another such as to provide space therebetween to provide clearance for a vertically extending locking bar of an adjacently positioned door on the trailing end of the body. The first mounting arm could be eliminated entirely with the material of the frame cover attached directly to the trailing end of the body.

Conventional truck bodies or trailer bodies often include two vertically extending doors each including a locking bar on the outer surface thereof and a locking bar handle extending horizontally therefrom. The configuration of the mounting arm of the present invention includes a first mounting arm section and a second mounting arm section spatially disposed from one another but both pivotally mounted with respect to the trailing end of the body such that it provides sufficient clearance for this locking arm to be fully functional whether the improved apparatus of the present invention is located in the stored position or a fully deployed position. The necessary clearance is achievable due to the trapezoidal shape of the frame wherein the first mounting arm will provide clearance on both sides of the locking bar. However, the first strut means will contact the locking bar at a point much lower when in the stored position to provide sufficient clearance for complete movement of the vertically extending panel means to the collapsed position. The capability for usage with vertically extending doors having large vertical locking bars mounted on the external surface thereof is achieved by a combination of the split construction of the first mounting arm used in combination with the trapezoidal shape of the first frame.

Also the covering on the frame can define small opening or cutout therein adjacent the locking bar to allow complete normal operative rotational movement thereof. This opening must be relatively small so as not to have an adverse affect on the aerodynamic characteristics of the apparatus of the present invention. It is preferable if the horizontal and vertical panels are sealed as much as possible with respect to the trailer or body. It is also important that the first frame be capable of being placed in the stored position extending downwardly along the rear poor or trailing end of the moving body. The position of the locking bar on most convention trailers would prevent storage in this position. However, with the present invention, storage in this position can be made possible by including the cutout area in the frame covering fabric immediately adjacent the locking bar. Also by choosing a fabric for the covering means which is flexible or includes a flexible section adjacent to the cutout area, the covering will stretch or flex slightly over the locking bar when the frame is moved to the stored position and yet the sealed integrity of the drag reducing apparatus of the present invention will be maintained.

A first link is included connecting the first vertical panel and the first frame and being pivotally attached to each. A first covering device of flexible material may be attached with respect to the first vertical panel and the trailing edge of the body and be attached such as to extend over the first frame and extend approximately horizontally when the first horizontal panel is located in the deployed position. This link can comprise merely the covering material which extends over the frame or can be a positively defined first link arms. Such a first link arm may be pivotally attached with respect to the first vertical panel and pivotally secured to the first outer rib of the first frame and be adapted to extend outwardly approximately perpendicular to the first vertical panel responsive to the first frame being in the deployed position.

The construction of this first frame can include an extension of the trapezoidal section to cover the entire vertical end. However, in the alternative, the first horizontal panel can include a second frame pivotally mounted with respect to the trailing end of the body and being similarly configured as a mirror image of the first frame. This second frame will include a second inner rib pivotally attached with respect to the trailing edge of the body to extend rearwardly therefrom when deployed. Also a second outer rib can be included pivotally attached with respect to the trailing end of the body at a position spatially disposed from the second inner rib. This second outer rib is preferably extendable outwardly to a deployed position angularly oriented with respect to the trailing end of the body and angled toward the second inner rib. This second outer rib is preferably oriented at approximately 45 degrees with respect to the second vertical panel in the deployed position. A second cross strut may be integrally configured with respect to the second inner rib such as to extend laterally outward therefrom toward the second outer rib to be integral therewith. A second inner spring device is connected with respect to the second inner rib to urge movement thereof to the deployed position approximately parallel to the top surface. A second outer spring may also be connected with respect to the second outer rib to urge movement thereof to the deployed position approximately parallel to the top surface.

A second mounting arm may also be integral with respect to the second inner rib and the second outer rib and pivotally mounted with respect to the trailing end of the body for pivotal movement of the second frame with respect to the trailing end of the body. The second mounting arm preferably includes an inside second mounting arm section and an outside second mounting arm section spatially disposed from one another to allow the second locking bar to be positioned therebetween and allow rotational movement thereof for locking at the second door upon which it is mounted. A second mounting arm is generally positioned parallel to the second cross strut and spatially disposed therefrom. The second mounting arm forms a trapezoidally shaped frame along with the integrally formed second inner rib, second outer rib and second cross strut in such a manner as to facilitate movement of the first horizontal panel to the deployed position where the first frame means and the second frame means are positioned parallel with respect to one another.

A second covering device of flexible material is attached with respect to the second vertical panel means and the trailing end of the body and is attached thereto and extends over the second frame to extend approximately horizontally responsive to the second horizontal panel being in the deployed position.

A second link arm may be pivotally attached with respect to the second vertical panel and is pivotally secured to the second outer rib of the second frame and is adapted to extend outwardly perpendicular to the second vertical panel responsive to the second frame being in the deployed position. Instead of the second link arm the second vertical panel can be attached to the second frame by the material of the second covering means. This second covering means can be pivotally attached to both the second vertical panel and the second frame to provide the linking interconnection therebetween.

To facilitate movement from the deployed position a first release cord may be connected to the first link arm as well as being attached at an intermediate location on the first vertical panel to facilitate downward movement of the first horizontal panel from the deployed position responsive to the exerting of a downwardly directed force on the first release cord. A second release cord may be connected to the second link arm and attached to an intermediate position on the second vertical panel to facilitate downward movement of the second horizontal panel from the deployed position responsive to exerting of a downwardly directed force on the second release cord.

With this configuration the improved apparatus preferably will also include a second horizontal panel positioned extending between the first vertical panel and the second vertical panel at a position below the first horizontal panel to define a dead air space therebetween which is immediately above the second horizontal panel. This dead air space will significantly improve the aerodynamic characteristics of the body when moving. This second horizontal panel is preferably pivotally secured with respect to the second vertical panel and defines an engagement aperture therein adapted to be positioned over a stud defined on the first vertical panel to allow detachable securement of the second horizontal panel with respect to the first vertical panel to facilitate positioning of the first horizontal panel retained in a deployed position extending horizontally between the two lower ends of the first vertical panels.

It should be appreciate that the use of the link arms is purely optional in the apparatus of the present invention. There must be a link of some kind between the frame and the vertical panel thereadjacent and this link can be provided merely by the covering extending over the frame. The covering itself can act to pull the frame to the deployed position responsive to movement of the associated vertical panel being moved to the deployed position.

Also the lower horizontal panel can have alternative constructions such a two panels extending toward one another horizontally with an central interlocking means engaging them together. Also the lower horizontal panel can be formed from a frame support configuration similar to the upper horizontal panel. It is preferable that such a structure for the lower horizontal panel to fold downwardly rather than upwardly to allow access to the locking bars and locking bar handle found on convention trailer body designs. With this configuration the apparatus of the present will allow fully automatic deployment. That is, merely by causing deployment of the two vertical panels, the operator can achieve full automated deployment of the entire apparatus. No additional deployment steps are required with this design since additional manipulation of the lowermost horizontally extending panel is not needed. Even the deployment of the two vertical panels can be achieved by means other than manual. For example, these two panel can be deployed by remote activation, or other powered means such as a solenoid controlled system.

It is an object of the present invention to provide an improved apparatus for reducing drag at the trailing edge of a moving body wherein deployment is made simple and easy in order to encourage a driver or operator to make use of the apparatus on a regular basis thereby significantly decreasing the fuel consumption of vehicles so equipped.

It is an object of the present invention to provide an improved apparatus for reducing drag at the trailing edge of a moving body wherein automatic deployment of a first horizontal upper panel and, optionally, also a second horizontal lower panel, can be achieved merely by effecting deployment of the first and second vertical panels.

It is an object of the present invention to provide an improved apparatus for reducing drag at the trailing edge of a moving body wherein the top panel will not accumulate excessive amounts of snow thereon.

It is an object of the present invention to provide an improved apparatus for reducing drag at the trailing edge of a moving body wherein the top horizontal panel flexes to shed snow and water therefrom in a direction away from the operating who is pivoting the vertical panel.

It is an object of the present invention to provide an improved apparatus for reducing drag at the trailing edge of a moving body wherein movement between the stored position and the deployed is made significantly easier at all times but especially during winter or adverse weather conditions.

It is an object of the present invention to provide an improved apparatus for reducing drag at the trailing edge of a moving body wherein the aerodynamic drag on the blunt trailing end of a moving body is significantly reduced.

It is an object of the present invention to provide an improved apparatus for reducing drag at the trailing edge of a moving body wherein an extension from the trailing end of a moving body is usable for reducing aerodynamic drag while not exceeding legal truck length limits.

It is an object of the present invention to provide an improved apparatus for reducing drag at the trailing edge of a moving body which is easily converted from a stowed position to a deployed position.

It is an object of the present invention to provide an improved apparatus for reducing drag at the trailing edge of a moving body which is easily moved from a deployed position to a stowed position.

It is an object of the present invention to provide an improved apparatus for reducing drag at the trailing edge of a moving body which does not interfere with conventional rear door opening or closing operations.

It is an object of the present invention to provide an improved apparatus for reducing drag at the trailing edge of a moving body which does not require a significant initial capital cost outlay.

It is an object of the present invention to provide an improved apparatus for reducing drag at the trailing edge of a moving body which is easy to maintain.

It is an object of the present invention to provide an improved apparatus for reducing drag at the trailing edge of a moving body which can be deployed without requiring any additional special deployment tools or devices such as poles, cranks, winches or other devices.

It is an object of the present invention to provide an improved apparatus for reducing drag at the trailing edge of a moving body which allows for automatic deployment of an uppermost horizontally extending panel simultaneously with deployment of the two vertically extending side panels.

It is an object of the present invention to provide an improved apparatus for reducing drag at the trailing edge of a moving body which includes an upper horizontally extending panel which has spring biased deployment aids mounted therein.

It is an object of the present invention to provide an improved apparatus for reducing drag at the trailing edge of a moving body which includes release cords connected from the first horizontally extending panel to one of the vertically extending panels to facilitate movement thereof from the deployed position to the collapsed position.

It is an object of the present invention to provide an improved apparatus for reducing drag at the trailing edge of a moving body which includes a foldable frame to facilitate collapsing of the first horizontal upper member in position immediately adjacent the rear doors of a truck or trailer body responsive to collapsing of two vertically extending panels against the rear doors of a truck.

It is an object of the present invention to provide an improved apparatus for reducing drag at the trailing edge of a moving body which provides clearance to allow full operation of the vertically extending locking bars used on the rear doors of conventionally configured large highway trailers.

It is an object of the present invention to provide an improved apparatus for reducing drag at the trailing edge of a moving body which provide a collapsible frame with a flexible covering material extending thereover to define the horizontally extending upper member positioned adjacent to and parallel with the top surface of the moving body.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
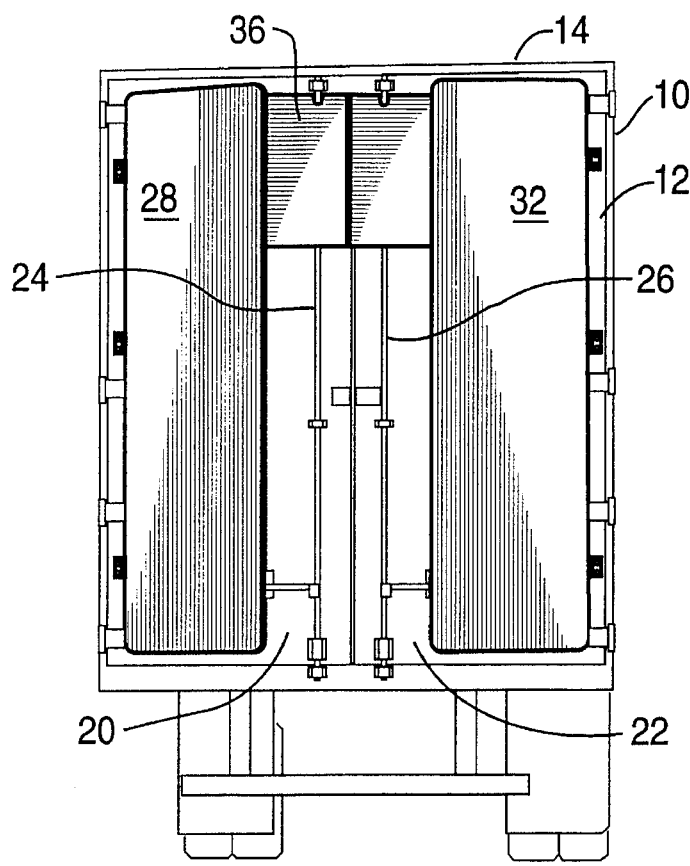
FIG. 1 is a front plan view of an embodiment of the improved apparatus of the present invention for reducing drag at the trailing end of a moving body shown in the fully collapsed position.
Figure 2:
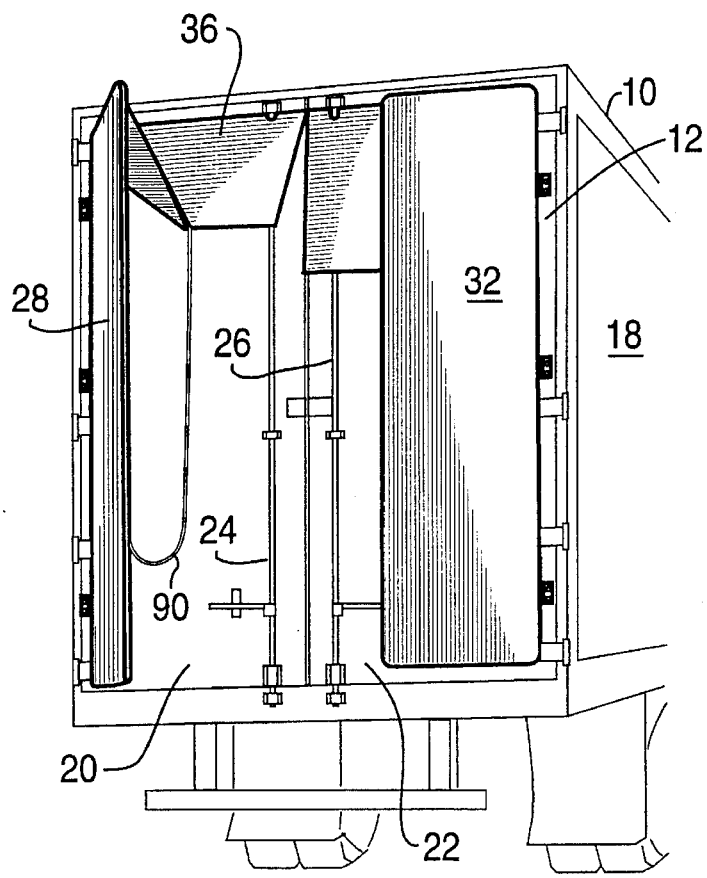
FIG. 2 is a plan view of the embodiment shown in FIG. 1 in the partially deployed condition.

This embodiment of the present invention is designed to improve the aerodynamics of a moving body 10 by providing panels extending rearwardly therefrom for the purpose of capturing vortexes thereadjacent to inhibit the back pressure and thereby enhance the fluid flow characteristics of an otherwise flat trailing end 12. Such a design is particularly usable with a moving body 10 having a top surface 14 along with a first side surface 16 and a second side surface 18 and a top surface 14 extending thereover.

Figure 10:
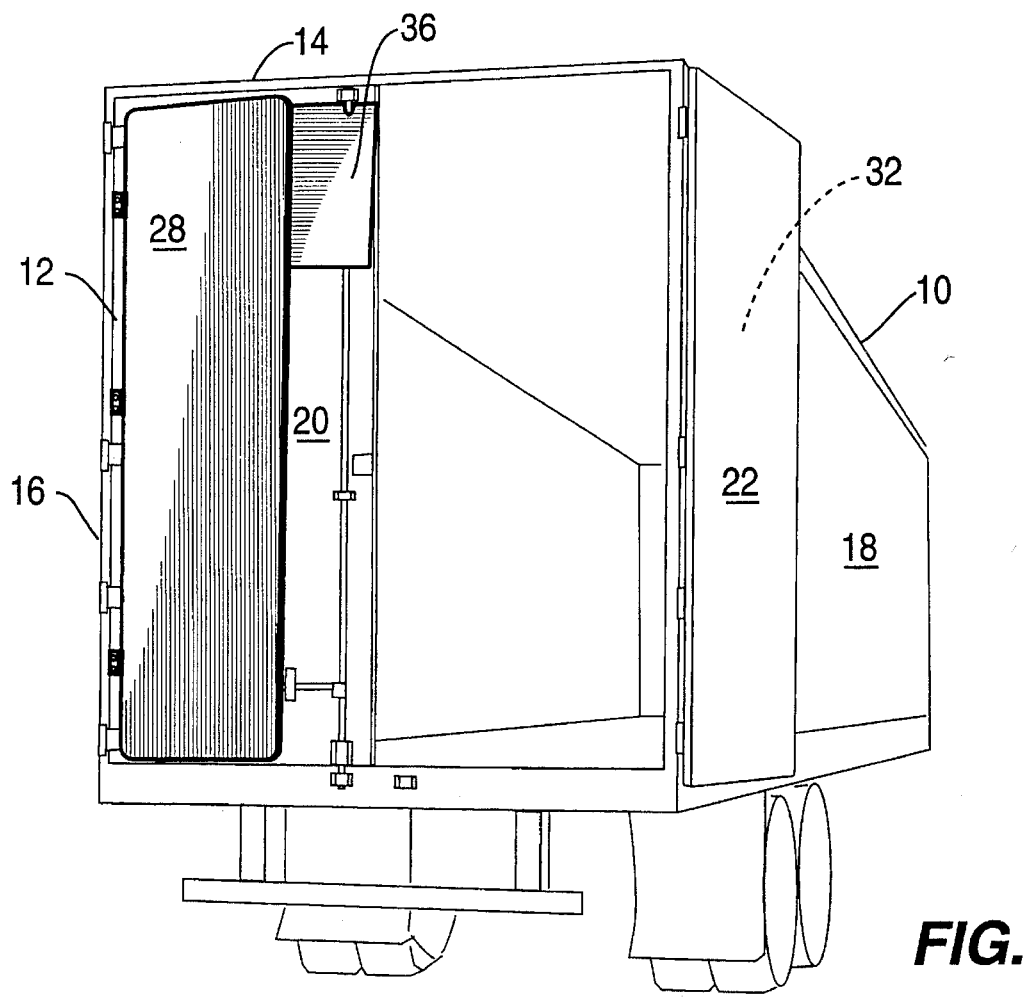
FIG. 10 is a plan view of an embodiment of the present invention showing the second door of the trailing end of a moving body in a fully opened position extending forwardly approximately parallel to the second side wall of the body.

Such constructions are most commonly used at the rear end of a trailer or truck which includes a first vertically extending door 20 and second vertically extending door 22 constructed meeting in the center of the trailing end 12 for closing thereof. The first door 20 preferably includes a first locking bar 24 extending vertically therealong and a second door 22 will include a second locking bar 26 mounted on the external surface thereof extending vertically with locking bar handles 166 extending horizontally therefrom. This is the conventional configuration of a trailer or truck body utilized in the configuration of most trucking vehicles currently used. It is an object of the present invention to provide an apparatus for reducing the drag at the rear of such vehicles wherein this apparatus is easy and convenient to move from the stored position to the deployed position and vice versa while at the same time allowing full lateral opening of the doors for loading and unloading as shown in FIG. 10 and providing full clearance for standard operation of the locking bars and handles.

One of the original prior art designs for such a vehicle drag reducer is shown in U.S. Pat. No. 4,682,808 issued Jul. 28, 1987 to A. J. Bilanin. This patent discloses many different types of configurations for panels extending rearwardly from a vehicle body to induce the formation of vortices thereadjacent to improve the aerodynamic characteristics of the overall vehicle and thereby hopefully improve gas mileage. The present invention, however, provides a more expedient structure utilizing multiple panels which are easy to deploy and easy to store to provide significant advantages over the design shown in U.S. Pat. No. 4,682,808. The design of the present invention allow storage or deployment of the apparatus without requiring the use of any lift poles, cranks, winches or other auxiliary tools or equipment thereby greatly encouraging actual use of the improved drag reducing apparatus.

In particular, the present design includes a first vertical panel 28 extending rearwardly from the trailing end 12 of the moving body at a position adjacent to the first side surface 16 thereof when deployed. This first vertical panel means 28 is pivotally movably attached to the trailing end 12 preferably on a hinge 100 between the rearwardly extending deployed position and a collapsed position immediately adjacent the first door 20. It should be appreciated that the improved apparatus for reducing drag of the present invention can be utilized with any moving body 10 having a trailing end 12 but the discussion of this preferred embodiment will be particularly directed toward a conventional highway trailer design with two horizontally swinging doors and two or more vertically extending locking bars such as bars 24 and 26 on the outer surface thereof. However, the design of the present invention can be utilized with any type of structure on the trailing end 12 of a moving body 10 such as a vertically moving door or, in fact, no doors at all.

The apparatus of the present invention further includes a second vertical panel means 32 extending vertically in spaced relation with respect to the first vertical panel 28 such as to define a dead air space area 34 therebetween. Such a dead space area 34 significantly improve the airflow characteristics of the body 10 when moving. When deployed this second vertical panel 32 will preferably extend rearwardly parallel to the second side surface 18 of the moving body 10. Second vertical panel 32 is preferably mounted with respect to a hinge 100 secured to the trailing end 12.

In the preferred configuration of the present invention a first horizontal panel 36 will be extendable horizontally between the first vertical panel 28 and the second vertical panel 32 such as to define the dead space area 34 therebelow to enhance airflow past the moving body 10. In a similar manner in a preferred configuration, a second horizontal panel means 94 will be extendable between the first vertical panel 28 and the second vertical panel 32 at a position in spaced relation with respect to the first horizontal panel 36 such as to define the dead space area 34 thereabove. Thus, the dead space area 34 will be positioned above the second horizontal panel 94 as well as below the first horizontal panel 36 and between the first vertical panel 28 and the second vertical panel 32.

The deployment of the first horizontal panel which is usually positioned somewhat close to the top surface 14 of the moving body 10 has been a problem in the design of vehicle drag reducers similar to that disclosed in the present invention. The first horizontal panel 36 must be deployed at a location relatively high on a truck or trailer at the trailing end 12 thereof between approximately 8 and 14 feet from ground level which is well beyond the reach of the vehicle operator. The inability to be able to manually reach this uppermost horizontal panel has required the use of additional implements such as poles, cranks, winches or other devices in order to fully deploy the first horizontal panel 36. The present invention provides a novel means for deployment of this first horizontal panel 36 responsive solely to deployment of the first vertical panel 28 and the second vertical panel 32 which are more easily reached by the operator. In an alternative configuration, this movement will also deploy the second horizontal panel 94.

This novel deployment method is made possible by the configuration of the first horizontal panel 36 with a first frame means 38. First frame 38, preferably, is pivotally mounted with respect to the trailing end 12 of the moving body 10 and, in the configuration wherein doors are utilized, is pivotally mounted with respect to the first door 20 or the immediate frame area therearound. The first frame 38 includes a first inner rib 40 which is pivotally mounted with respect to the rear door and extends approximately perpendicularly outwardly therefrom when in the deployed position. The first frame 38 further includes a first outer rib 42 which is positioned in spaced relation from the first inner rib 40 and extends outwardly from the trailing end 12 angularly with respect thereto. With the first horizontal panel 36 in the fully deployed position and with the first vertical panel 28 in the fully deployed position, the first outer rib 42 will extend at an angle of approximately 45 degrees as shown by reference numeral 44 with respect to the trailing end 12 as well as with respect to the first vertical panel 28. This angular configuration results from orienting the alignment line 164 of the outer ribs 42 and 68 in line with the point of pivot of the vertical panels 28 and 32.

A first cross strut 46 is also included within the first frame 38 and is of such a configuration as to preferably be integral with respect to the outermost ends of the first inner rib 40 and the first outer rib 42 for integrally connecting them with respect to one another. As such, the first frame 38 comprising the first inner rib 40, the first outer rib 42 and the first cross strut 46 is pivotally movable with respect to the trailing end 12 of the moving body 10 in such a manner as to facilitate deployment of the first horizontal panel 36.

Full deployment of the first frame 38 to extend perpendicularly rearwardly from the trailing end 12 is further enhanced by the inclusion of a first inner spring biasing means 48 which is interconnected to the first inner rib means for biasing thereof toward the fully deployed position extending perpendicularly rearwardly from the trailing end 12. The configuration of this first inner spring biasing means 48 can comprise a coil spring which is pre-loaded and attached to the first inner rib 40 for urging movement thereof to the deployed position.

In a similar manner a first outer spring biasing means 50 may be included which is connected to the first outer rib means 42 in such a manner as to urge movement thereof toward the deployed position extending rearwardly from the trailing end 12.

Alternatively, an auxiliary biasing means 162 may be connected between the first link arm 60 and the first frame means 38 for biasing thereof toward the deployed position. This auxiliary spring or biasing means can be used alone or in addition to the first inner and outer spring biasing means 48 and 74.

A first mounting arm means 52 may extend parallel with respect to the trailing end 12 or with respect to the first door 20 and is particularly advantageous when used in combination with a body configuration 10 having a locking bar 24 thereon. When used with a locking bar the first mounting arm 52 will preferably comprise two individual separated sections. The first part is the inside first mounting arm section 54 and the other part is the outside first mounting arm section 56. These two sections are spaced from one another to define an opening therebetween to allow full operational movement of the first locking bar 24. The inside first mounting arm section 54 and the outside first mounting arm section 56 are preferably coaxially mounted with respect to one another and may be pivotally mounted with respect to the trailing end 12. It should be appreciate that the mounting arms of the present invention could be omitted and replaced by a direct connection between the trailing end of the vehicle and the first covering means 62 extending over the first frame 38. This configuration would also achieve the desired pivotal connection between the frame and the body.

Figure 19:
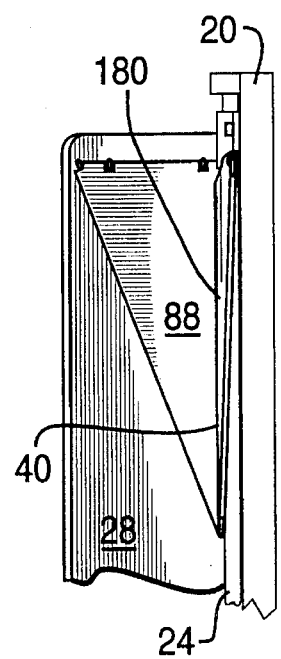
FIG. 19 is a side plan view of an embodiment of the first frame means shown in the storage position with a flexible covering portion extending stretched over a locking bar with the first vertical panel in the partly closed position.

With this configuration the first frame 38 will assume a generally trapezoidal shape with the base comprising the first mounting arm 52 and the opposite parallel side comprising the first cross strut 46 interconnected by the first inner rib 40 and the first outer rib 42 to form this trapezoidal shape. This trapezoidal shape and a cutaway 190 of the covering material and the flexible sections 192 and 194 adjacent to the locking bar will provide sufficient clearance to allow movement of the first horizontal panel 36 from the stored position to the collapsed position and vice versa responsive to pivotal movement of the trapezoidal shaped frame 38 with respect to the trailing end 12. FIG. 19 shows the first vertical panel in the partly closed position with the material of the first covering stretched over first locking bar. The flexible area 192 is showed stretched along flexing line 180 in the FIG. 19 side view. The amount of stretching is greater in the upper portion of the first covering 62. Less stretching is required in the lower area since the first cross strut 46 will be positioned across the outer surface of the first locking bar 24. A similar construction can be included over the second door 22 using the stretching of a second flexible area 194 of a second covering means 88 over the second locking bar 26 to allow movement of a second frame 64 to a fully collapsed position thereover.

Figure 18:
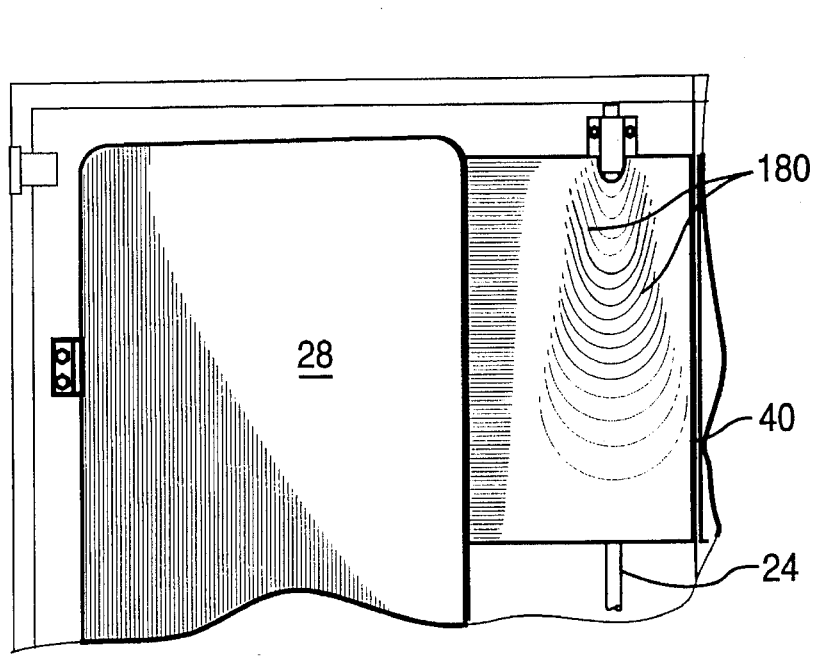
FIG. 18 is a close-up view of the intersection between the covered first frame and the first locking bar with the first covering of flexible material extending over the first frame and stretched over the first locking bar.

Movement of the first frame 38 with first covering 62 extending thereover to the stored position is great facilitated by the use of a first covering material of flexible material in combination with the cutaway section 190. As shown best in FIG. 18 when the first horizontal panel is moved to the stored position extending downwardly over the trailing end 12 is can contact the first locking bar 24 thereby preventing full movement to the storage position. The cutaway section 1990 of the first covering 62 provides some clearance. This choice of the fabric or material of the covering 62 to be flexible, at least in the area adjacent the first locking bar 24, allows the covering 62 to stretch or flex slightly to extend over the first locking bar 24 as shown in FIG. 18. This causes the formation of a vertical stretched area 180 in the covering 62 where it extends over the downwardly extending locking bar 24. The flexing of this flexible covering material adjacent the locking bar allows the first horizontal frame 38 to move to the fully stored position.

To facilitate control of movement of the first frame 38 with respect to the moving body 10, a first link 60 is preferably pivotally secured to the inside portion of the first vertical panel 28. This link 60 can be achieved by a section of the covering material or can be a positive link such as by a first link arm 60. Either configuration will work sufficiently. With use of the first link arm 60, it is preferably also pivotally secured with respect to the first frame 38 to facilitate control during movement thereof between the collapsed and the deployed position. This first frame 38 in combination with the first link 60 will provide the framework over which is positioned a first covering means 62 of flexible material. A plurality of sleeves may be defined in the first covering 62 which surrounds or holds therein the individual sections of the first frame 38 and the first link arm 60. For example the first inner rib sleeve means 63 will retain therein the first inner rib means 40.

With this configuration the first horizontal panel 36 can be defined. In fact the first horizontal panel 36 can be fully defined merely by the single first frame member 38 if the inside first mounting arm section 54 and the first cross strut member 46 are defined large enough to extend fully from the first vertical panel 28 to the second vertical panel 32. However, in this preferred configuration a second frame means 64 will also be included as shown best in FIG. 7 over which a second covering means 88 of flexible material will extend to define the portion of the first horizonal panel 36 which is adjacent to a second door 22.

One of the unique advantages of the ease of deployment of the apparatus of the present invention is that the uppermost horizontal panels and others need not be constructed to meet specifications for support of a significant amount of snow or water thereon. Due to the great ease with which the first horizontal panel 36 and others panels can be deployed and collapsed, an operator can store the apparatus at night and thus prevent an overnight accumulation of snow or ice thereupon. This will allow deployment of a clean unencumbered panel every morning or whenever an operator initiates operation of the vehicle or moving body 10. Also, the natural movement of the panel during automatic deployment or collapsing by the operator will allow removal of accumulated dirt, snow and water from the panels in a direction away from the location of the operator.

Without these strength requirements the panels 28, 32, 36 and 94 of the present invention can be constructed of more lightweight materials thereby further enhancing energy conservation advantages of this construction. Since the overall improved design of the present invention is a significantly strong yet lightweight apparatus, and because it can be attached directly to the trailing end of the moving body, the apparatus of the present invention will be more firmly secured to the moving body than other prior art devices, thereby increasing reliability and reducing chances for catastrophic failure.

This second frame 64 can similarly comprise a second inner rib 66 positioned immediately adjacent to the first inner rib 40 of the first frame 38 when in the fully deployed position. Second inner rib 66 can extend rearwardly from the trailing end 12 approximately perpendicular to the surface of the second door 22 when in the fully deployed position. Second frame 64 will be pivotally movable with respect to the trailing end 12 to facilitate deployment of its portion of the first horizontal panel. The second frame 64 will include also a second outer rib means 68 angularly oriented with respect to the trailing end 12 at approximately a 45 degree angle shown by reference numeral 70 with respect thereto. A second cross strut means 72 will be included in the second frame integrally interconnected the first inner rib means 66 with the second outer rib means 68 in such a manner as to form a single integral second frame configuration 64.

This configuration of the second frame 64 will be pivotally movable with respect to the trailing end 12 of the moving body 10 and can include a biasing means to facilitate urging thereof to the fully deployed position extending rearwardly from the second door 22.

A second inner spring biasing means 74 can be connected to the second inner rib member 66 to facilitate movement thereof to the fully deployed position extending perpendicularly with respect to the second door 22. Also a second outer spring biasing means 76 can be connected to the second outer rib means 68 for urging movement thereof to the fully deployed position. Each of these biasing configurations can include a coil spring along with an end portion of the spring engaged with respect to the second inner rib 66 or the second outer rib 68 respectively to facilitate pivotal movement thereof to the fully deployed position.

Figure 7:
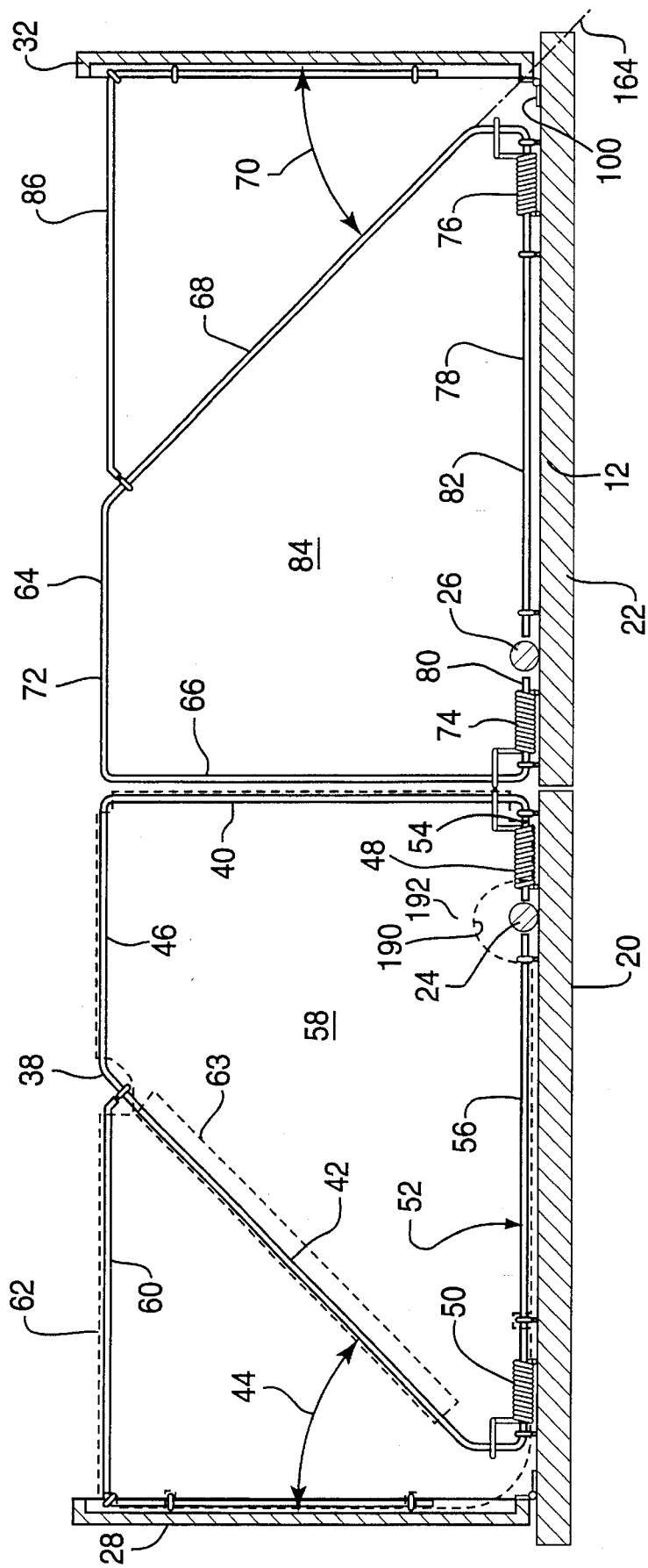
FIG. 7 is a bottom plan view of an embodiment of the first frame and second frame of the present invention shown mounted with respect to the trailing end of a moving body and the two vertically extending side panels.
Figure 8:
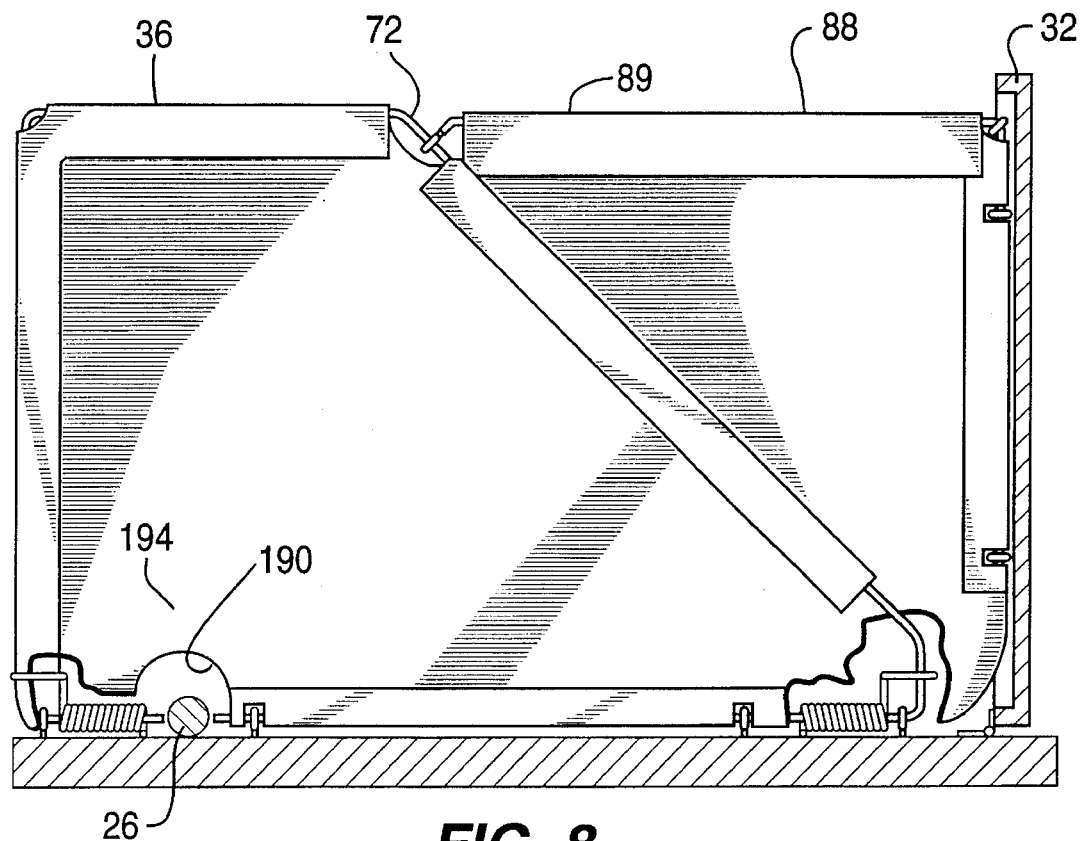
FIG. 8 is a bottom plan view of the second covering means shown extending over the second frame for facilitating deployment of the first horizontal panel member.
Figure 9:
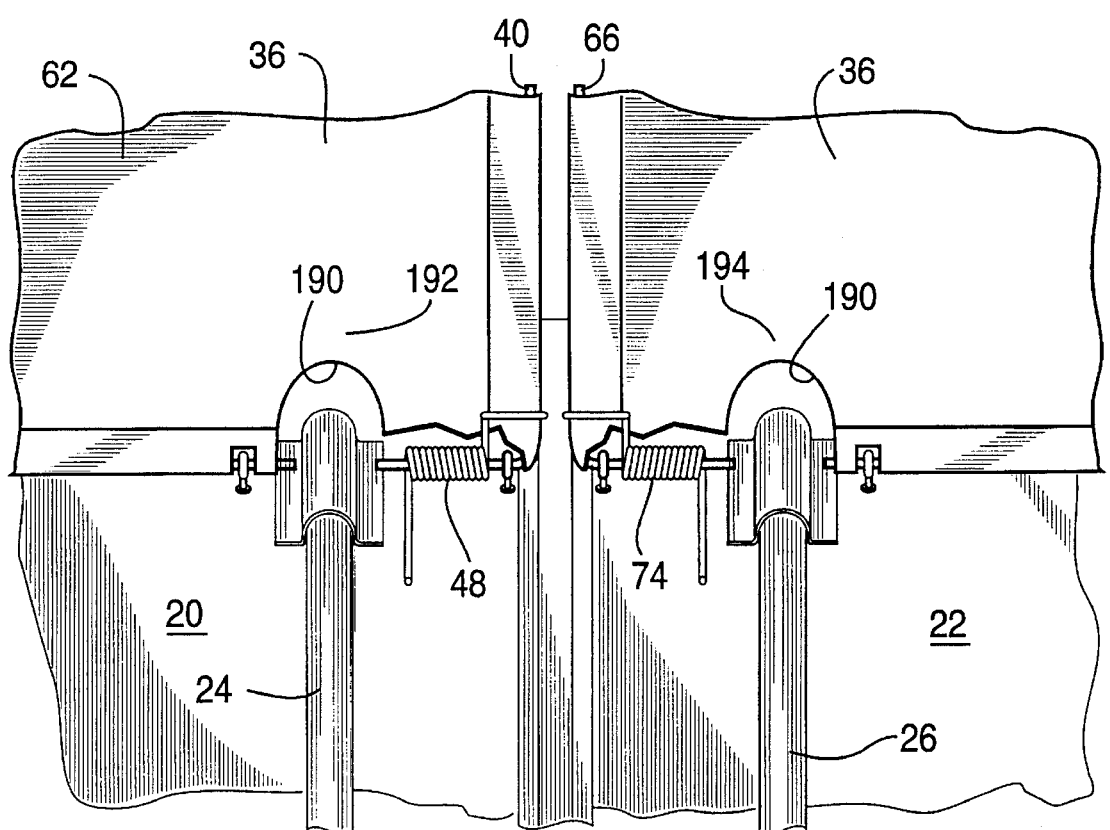
FIG. 9 is a close-up view of the intersection between the first and second doors and first and second locking bars of the trailing end of a moving body and the first and second covering device of flexible material extending over the first and second frames respectively as pivotally mounted with respect to the doors.

The second frame covering means 88 can be pivotally secured pivotally to the trailing end 12 itself or can be pivotally attached to a second mounting arm 78. Second mounting arm 78 preferably extends approximately parallel to the second door 22 and further preferably pivotal with respect thereto. This second mounting arm 78 will preferably be formed in two sections including the inside second mounting arm section 80 and the outside second mounting arm section 82. Sections 80 and 82 will preferably be coaxial with respect to one another and will be spaced from one another to define an opening therebetween through which the second locking bar 26 can extend as best shown in FIG. 9. The spacing between the sections 80 and 82 can be great enough to allow positioning of two such second locking bars 26 therebetween as shown in FIG. 7.

With this configuration the second frame 64 will take on a generally trapezoidal shape 84 formed by the two sections of the second mounting arm 78 and the second cross strut 72 which are parallel with respect to one another interconnected by the second inner rib means 66 of the second outer rib means 68. This trapezoidal shape, used in combination with the link means from the flexible cover fabric or the link arm itself, is important in regard to the present invention in allowing for full clearance of the locking bar associated with the door to which it is pivotally mounted while at the same time providing a full degree of movement of the first horizontal panel 36 between the fully deployed position and the stored position. Clearance adjacent the locking bars should also be provided by a cutaway of the material of the second covering means adjacent the locking bars.

Movement of the second frame 64 with second covering 88 extending thereover to the stored position is great facilitated by the use of a second covering material of flexible material in combination with the cutaway section 190. When the second horizontal panel is moved to the stored position extending downwardly over the trailing end 12 is can contact the second locking bar 26 thereby preventing full movement to the storage position. The cutaway section 190 of the second covering 88 provides some clearance. The choice of the fabric or material of the covering 88 to be flexible, at least in the area adjacent the second locking bar 26, allows the covering 88 to stretch or flex slightly to extend over the second locking bar 26. This causes the formation of a vertical stretched area in the covering 88 where it extends over the downwardly extending locking bar 26. The flexing of this flexible covering material adjacent the locking bar allows the second horizontal frame 64 to move to the fully stored position.

Control of movement of the second frame 64 with respect to the trailing end 12 is achieved by a second link arm means 86 pivotally secured to the inside of the second vertical panel means 28 and pivotally secured with respect to the second frame 64 and preferably the second outer rib 68 thereof. This second link arm will move vertically with the second frame 64 from a position extending vertically outward from the rear surface of the second vertical panel 28 when deployed to a fully collapsed position extending downwardly with the frame means parallel to the second vertical panel 32 and the second door 22 when not in use.

A second covering means 88 preferably of a flexible material will extend over the second frame means 64 and also the second link arm 86 in such a manner as to provide the surface for defining the first horizontal panel 36. The second covering means 88 will define a plurality of sleeves each of which surrounds either of the ribs 66 or 68 or the cross strut 72 or the second mounting arm 78 in such a manner as to be moved therewith between the collapsed position and the fully deployed position as required. As shown in the drawings, the second outer rib sleeve means 89 is an example of these sleeves shown surrounding the second outer rib 66 for facilitating deployment of the first horizontal panel.

Once the design is deployed, movement from the deployed position to the collapsed position is enhanced by the inclusion of a first release cord means 90 extending from the first frame means downwardly. If the operator pulls on the first release cord 90 in a downward direction this will cause a force against the spring biasing means which will urge the first frame means 38 to pivot downwardly and move toward the collapsed position. In a similar manner a second release cord 92 may be secured to the second frame 64 at a position thereon to allow an operator to pull downwardly on the release cord 92 thereby urging the second frame 64 to collapse downwardly for movement of the apparatus of the present invention to the collapsed position.

As has been described above, movement of the first vertical panel member 28 to the deployed position and the second vertical panel member 32 to the deployed position will allow for automatic deployment of the first horizontal panel member 36 thereabove to extend laterally and rearwardly. It is then necessary to provide a means for deployment of the second horizontal panel means 94 which should extend below the dead space area 34.

Figure 3:
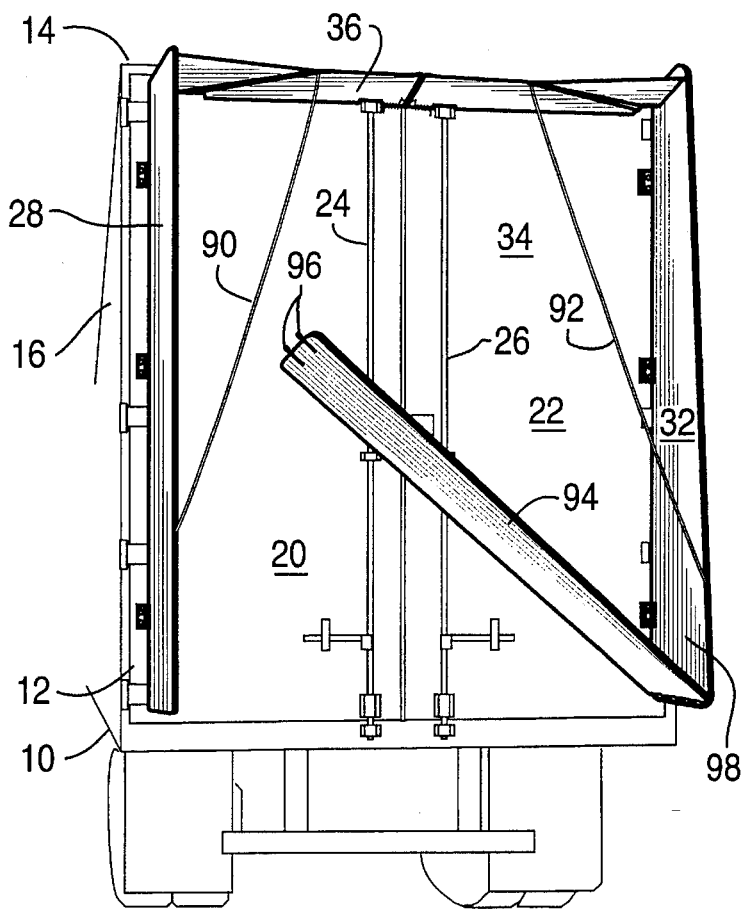
FIG. 3 is a plan view of the embodiment shown in FIG. 1 in a position further deployed than shown in the view of FIG. 2.
Figure 4:
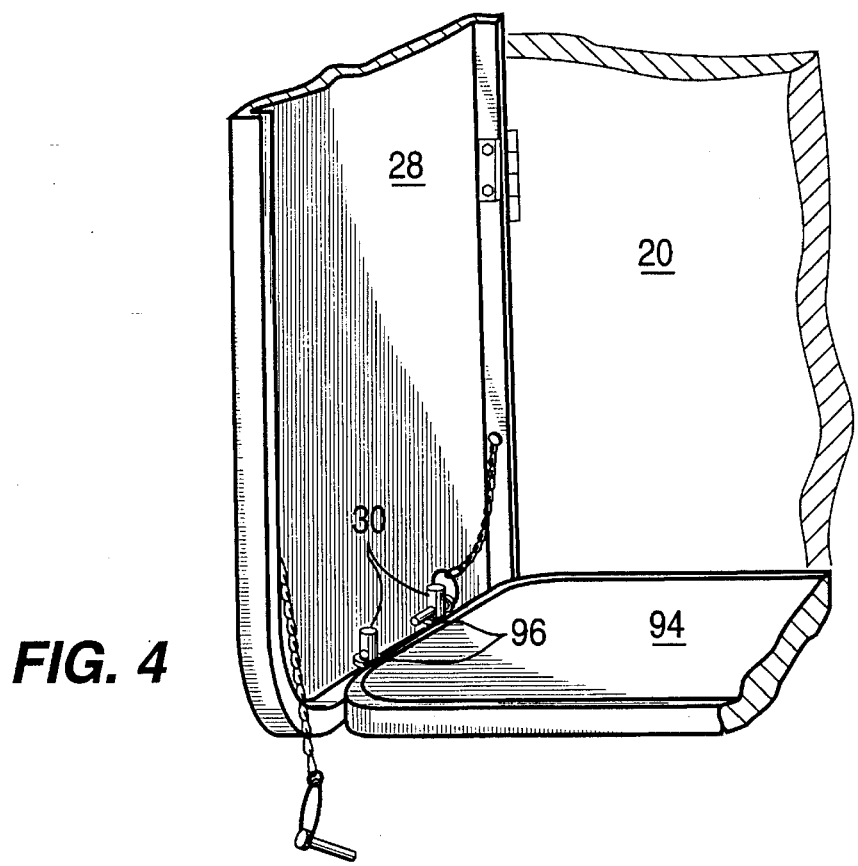
FIG. 4 is a close-up perspective illustration of an embodiment of the second horizontal panel of the present invention shown being attached in place to the lower portion of the first vertical panel.
Figure 5:
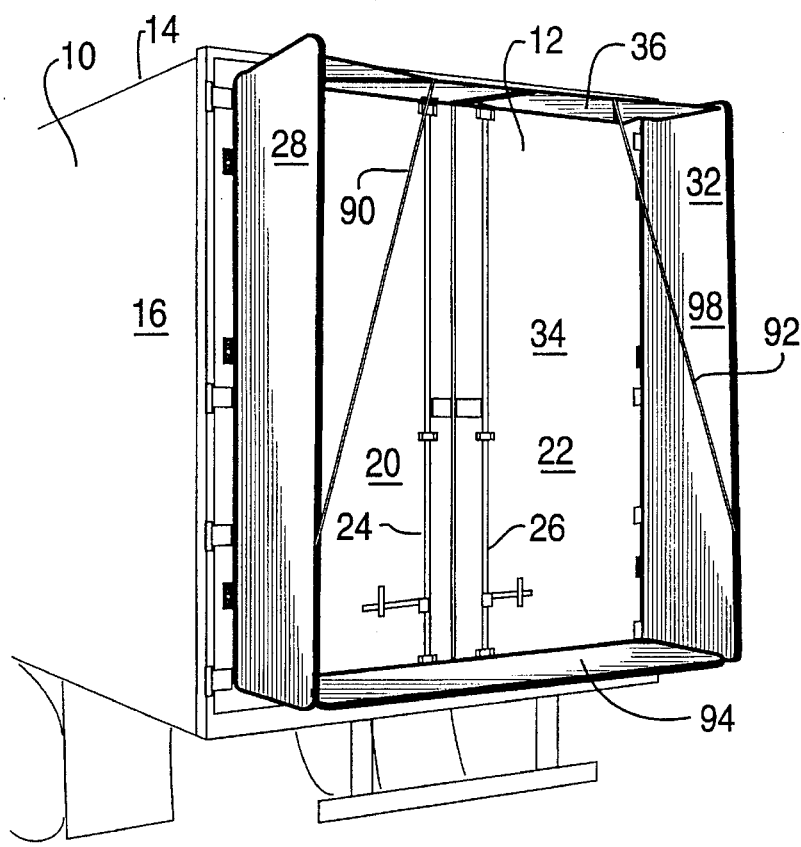
FIG. 5 is a plan view of the embodiment shown in FIG. 1 in the fully deployed position.
Figure 6:
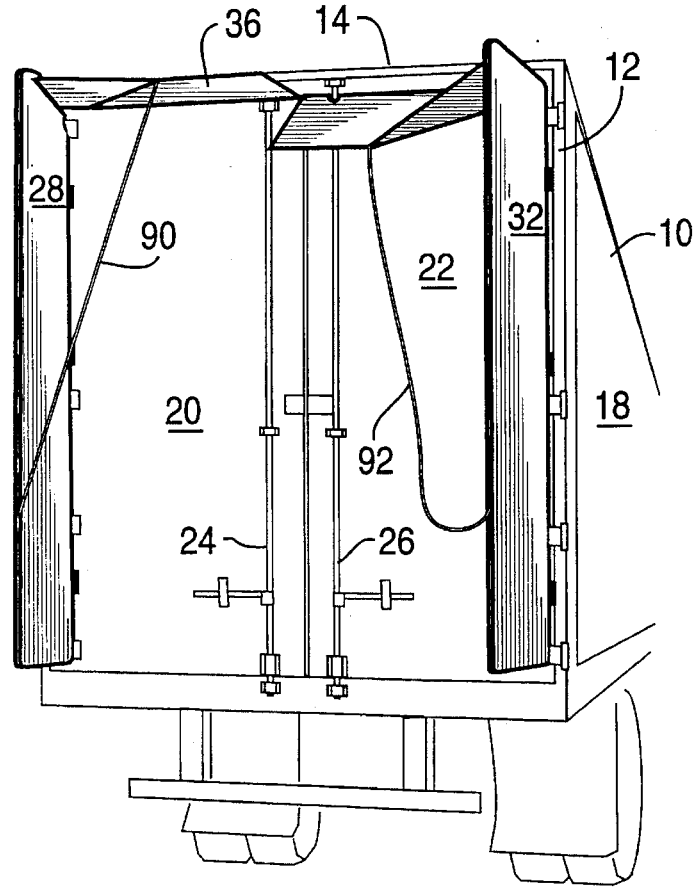
FIG. 6 is a plan view of the embodiment shown in FIG. 1 shown being moved from the deployed position partially to the storage position.

In the embodiment shown in FIGS. 3–5 the second horizontal panel 94 is stored within an interior recess 98 defined on the inner surface of the second vertically extending panel 32. This recess is of sufficient depth to contain the second horizontal panel 94 secured therein when in the collapsed position. However, once vertical panel 32 is moved to the opened position the second horizontal panel 94 can be moved downwardly. Preferably second horizontal panel 94 is pivotally mounted with respect to the lower end of panel 32 in such a manner as to move downwardly to extend in a horizontal position whereby the dead space area 34 is defined thereabove. A connecting means will then be included for engaging of the second horizontal panel means 94 with respect to the lower portion of the first vertical panel 28.

In the preferred configuration for this engagement means the first vertical panel will include one or more vertically extending studs 30 adapted to extend through engagement apertures 96 defined in the second horizontal panel 34. This mounting apparatus for the second horizontal panel 94 is shown best in FIGS. 3 and 4. FIG. 3 shows the pivotal movement of the second horizontal panel 94 with respect to the second vertical panel 32 and FIG. 4 shows the interconnection between the engagement apertures 96 thereof and the studs 30 included on the first vertical panel 28.

Figure 13:
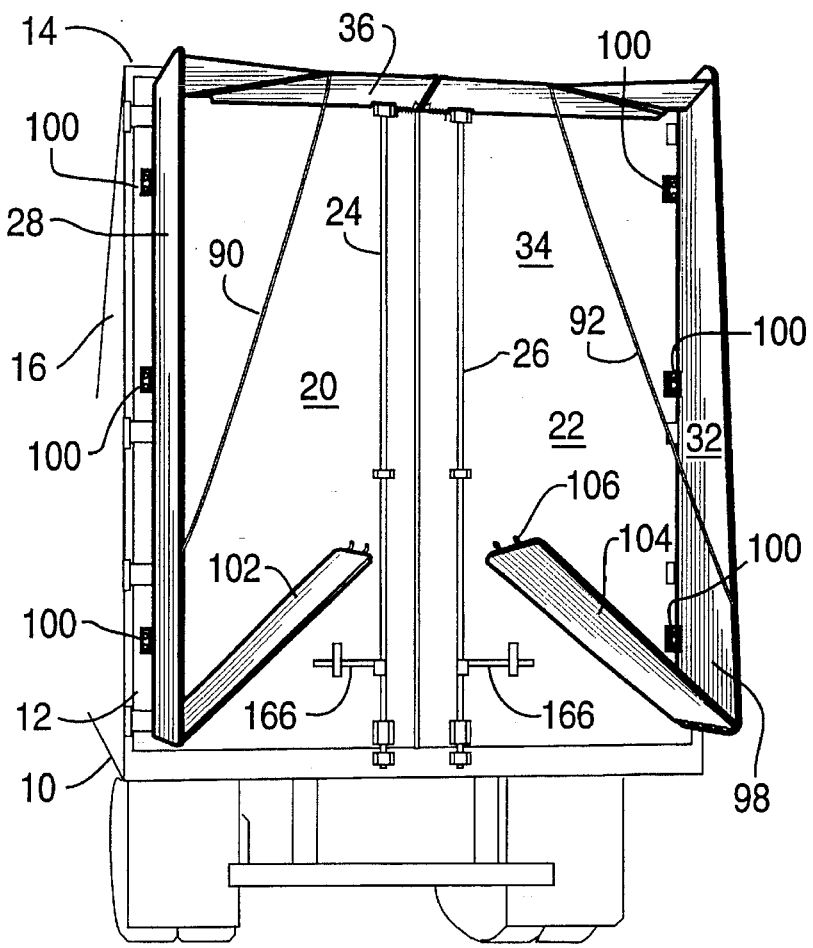
FIG. 13 is a plan view of another alternative embodiment of the apparatus of the present invention shown in the partially deployed position.
Figure 14:
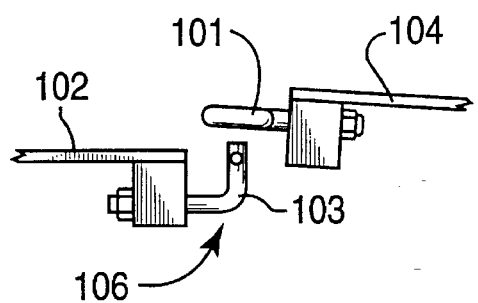
FIG. 14 is a side plan view of an embodiment of the central interlocking means shown in FIG. 13.
Figure 15:
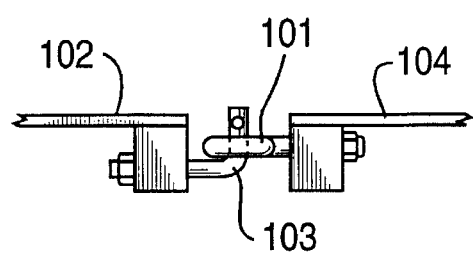
FIG. 15 is a side plan view as shown in FIG. 14 showing the central interlocking means in the locked position.
Figure 16:
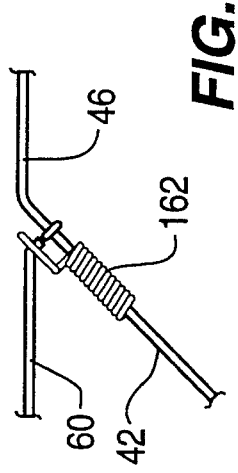
FIG. 16 is a top plan view of an embodiment of the auxiliary biasing means according to the present invention usable for urging the first, second, third, or fourth frame means to the deployed position.

In an alternative configuration for the second horizontal panel means 94, it will include a first lower horizontal panel section 102 and a second lower horizontal panel section 104 as shown best in FIGS. 13–15. Here each of panels 102 and 104 are shown of approximately the same size sufficient to meet when extended horizontally at the midpoint between the vertical panels 28 and 32. These panel 102 and 104 can be of any relative size but with equal horizontal dimensions they can be interconnected through a central interlocking means 106 for securement in the deployed position.

Central interlocking means 106 can include an aperture defining means such as an eyebolt 101 attached to one of the panels 102 and 104. The other panel can include a mounting pin 103 engageable with the eyebolt 101 to form the central interlocking means to retain the panels 102 and 104 in the deployed position as shown best in FIGS. 14 and 15.

Operation of the improved apparatus for reducing drag of the present invention is made quite simple by the automated deployment and movement characteristics of this embodiment. In particular, for deployment the operator must initially rotate the first vertical panel 28 outwardly to a position parallel to the first side surface 16 which will automatically deploy the first frame 28 which will achieve deployment of the left half of the first horizontal panel means 36. The operator will then deploy the second vertical panel 32 by pivoting thereof to a position approximately parallel to the second side surface 18 which will achieve movement of the second frame 64 to the fully deployed position extending rearwardly approximately parallel to the second side surface 18. This movement will automatically achieve deployment of the right half of the first horizontal panel 36 which is adjacent to the second vertical panel 32. The user will then remove the second horizontal panel 96 from the interior recess 98 on the inner surface of second vertical panel 32 as shown in FIG. 3 and will engage that panel with respect to the first vertical panel 28 as shown in FIG. 4. In this configuration the improved apparatus for reducing drag at the trailing edge of a moving body shown in this embodiment is fully deployed.

Movement from the deployed position to the storage or collapsed position requires a reversal of the above steps. Initially the engagement apertures 96 are disengaged from the studs 30 and the second horizontal panel means 94 is rotated to a position to be contained within the interior recess defined on the inner surface of second vertical panel 32. At this point the second vertical panel 32 can be rotated to a position extending parallel with respect to the second door 22 and the first vertical panel 28 can be rotated to a storage position extending parallel to the first door 20. By movement of second vertical panel 32 to the stored position the second frame means 64 and the covering thereover will be moved to the collapsed position extending downwardly parallel to the second door 22. Similarly movement of first vertical panel means 28 to the collapsed position will cause movement of the left half of the first horizontal panel 36 or the first frame means 38 downwardly to a storage position parallel to the first door 20.

It should be appreciated that the preferred design of the present invention provides an automated means for deploying of an apparatus for reducing drag at the rear of a moving vehicle which is easy to deploy and does not require any additional implements, tools or other special equipment to achieved full movement from full deployment to the collapsed position. Also it is important to note that the apparatus of the present invention is movable to the fully stored position to allow full operation of the first and second doors 20 and 22 as conventionally included on the rear of a truck trailer and also to allow full operation of the first and second locking bars 24 and 26 normally included associated therewith. The present invention also provides sufficient clearance for full operation of the locking bars while still allowing the first and second doors to be fully opened to a position extending forwardly toward the front portion of the vehicle parallel to the first and second side surfaces 16 and 18 as normally located during loading and unloading of such a trailer body.

In an alternative configuration of the present invention the second horizontal panel means 94 will be of a general configuration similar to that of the first horizontal panel means 36. This embodiment is shown best in FIGS. 11–15 and 17. In this embodiment the second horizontal panel means will include a third frame means 108 and preferably a fourth frame means 129.

Third frame means 108 will include a third inner rib means 110 and a third outer rib means 112. Furthermore it will include a third cross strut means 114 extending therebetween and preferably integral therewith. This third frame means 1080 will be pivotally mounted with respect to the trailing end of the moving body 10 to facilitate movement to the deployed position extending rearward therefrom to define the second horizontal panel mean 94 immediately below the dead space area 34.

A third mounting arm 120 can be attached to the trailing end 12 and also be integrally formed with respect to said third inner rib means 110, said third outer rib means 112 and said third cross strut means 114 to define therewith said third frame means 108.

A spring biasing means is preferably mounted with respect to said third frame means to urge movement thereof toward the deployed position. This spring biasing means can comprise a third inner spring biasing means 116 mounted with respect to said third inner rib means 110 and said third mounting arm 120. Alternatively, or additionally, a third outer spring biasing means 118 can be included mounted with respect to said third outer rib means 112 and said third mounting arm 120. The spring biasing means can alternatively, or additionally, include a third auxiliary spring biasing means mounted between said third link arm means 126 and said third frame means 108 to urge movement thereof toward the deployed position.

Figure 17:
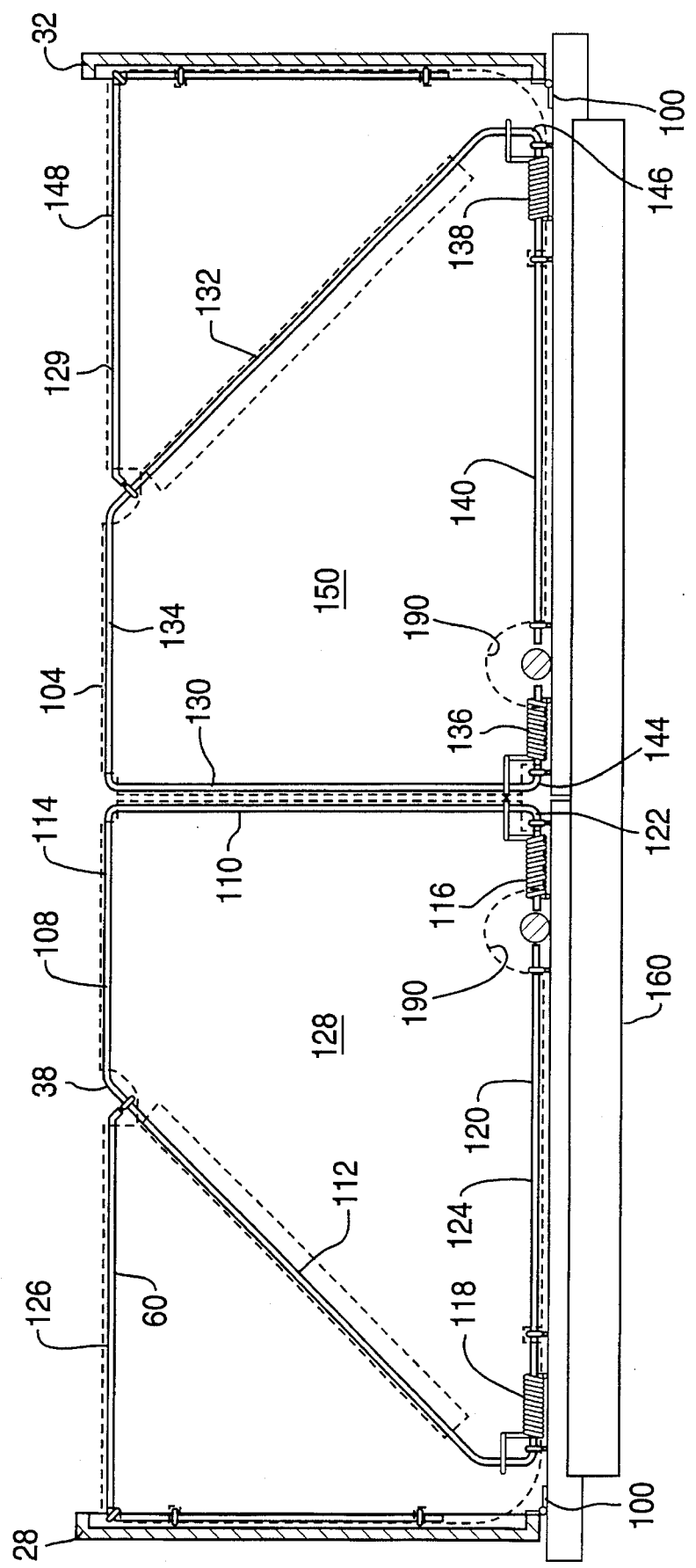
FIG. 17 is a bottom plan view of an alternative embodiment of the present invention showing the third and fourth frame means in the deployed position.

It is preferable that the third mounting arm 120 be formed as two separate parts, namely, the third inside mounting arm section 122 and the third outside mounting arm section 124. These two separate sections will be spaced from one another to define an open area therebetween to provide the necessary clearance for the conventional locking bars often found on standard trailers. The third inside mounting arm section 122 and the third outside mounting arm section 124 should preferably be positioned co-axial with respect to one another as shown in FIG. 17.

The third frame means preferably includes a third covering means 128 extending thereover to provide the surface to define the second horizontal panel means 94. This covering means will usually comprise some type of fabric or material which is fairly strong and is somewhat flexible. This is the same type of material preferably used on the first covering means 62 and the second covering means 88 described hereabove.

A third link means 126 is preferable with this embodiment of the present invention which is pivotally attached to the first vertical panel means 28 and to the third frame means 108. This pivotal link 126 is helpful to facilitate movement of the third frame means 108 to the deployed position responsive to movement of the first vertical panel means 28 to the deployed position. This link means 126 can be formed merely by the portion of the third covering means 128 extending between said third frame means 108 and the first vertical panel means 28. Such a covering means of material or fabric can provide the pivotal link needed to facilitate deployment of the third frame means 108 simultaneously with deployment of the first vertical panel means 28. Alternatively, however, the third link means can comprise a third link arm 126 which is pivotally attached with respect to the first vertical panel means 28 and with respect to the third frame means 108. This separate linking member 126 is best shown in FIG. 17.

With this alternative configuration of the present invention the second horizontal panel means 94 will be of a general configuration similar to that of the first horizontal panel means 36. This embodiment is shown best in FIGS. 11–15 and 17. In this embodiment the second horizontal panel means will include, not only a third frame means 108, but also may preferably include a fourth frame means 129.

Fourth frame means 129 may include a fourth inner rib means 130 and a fourth outer rib means 132. Furthermore it may include a fourth cross strut means 134 extending therebetween and preferably integral therewith. This fourth frame means will be pivotally mounted with respect to the trailing end of the moving body 10 to facilitate movement to the deployed position extending rearward therefrom to define the second horizontal panel mean 94 immediately below the dead space area 34.

A fourth mounting arm 140 can be attached to the trailing end 12 and also be integrally formed with respect to said fourth inner rib means 130, said fourth outer rib means 132 and said fourth cross strut means 134 to define said fourth frame means 129.

A spring biasing means is preferably mounted with respect to said fourth frame means to urge movement thereof toward the deployed position. This spring biasing means can comprise a fourth inner spring biasing means 136 mounted with respect to said fourth inner rib means 130 and said fourth mounting arm 140. Alternatively, or additionally, a fourth outer spring biasing means 138 can be included mounted with respect to said fourth outer rib means 132 and said fourth mounting arm 140. The spring biasing means can alternatively, or additionally, include a fourth auxiliary spring biasing means mounted between said fourth link arm means 126 and said fourth frame means 129 to urge movement thereof toward the deployed position.

It is preferable that the fourth mounting arm 140 be formed as two separate parts, namely, the fourth inside mounting arm section 144 and the fourth outside mounting arm section 146. These two separate sections will be spaced from one another to define an open area therebetween to provide the necessary clearance for the conventional locking bars often found on standard trailers. The fourth inside mounting arm section 144 and the fourth outside mounting arm section 146 should preferably be positioned co-axial with respect to one another as shown in FIG. 17.

The fourth frame means preferably includes a fourth covering means 150 extending thereover to provide the surface to define the second horizontal panel means 94. This covering means will usually comprise some type of fabric or material which is fairly strong and is somewhat flexible. This is the same type of material preferably used on the first covering means 62 and the second covering means 88 described hereabove.

A fourth link means 148 is preferable with this embodiment of the present invention which is pivotally attached to the second vertical panel means 28 and to the fourth frame means 129. This pivotal link 148 is helpful to facilitate movement of the fourth frame means 129 to the deployed position responsive to movement of the second vertical panel means 28 to the deployed position. This link means 126 can be formed merely by the portion of the fourth covering means 150 extending between said fourth frame means 129 and the second vertical panel means 28. Such a covering means of material or fabric can provide the pivotal link needed to facilitate deployment of the fourth frame means 129 simultaneously with deployment of the second vertical panel means 28. Alternatively, however, the fourth link means can comprise a fourth link arm 126 which is pivotally attached with respect to the second vertical panel means 28 and with respect to the fourth frame means 129. This separate linking member 126 is best shown in FIG. 17.

Figure 11:
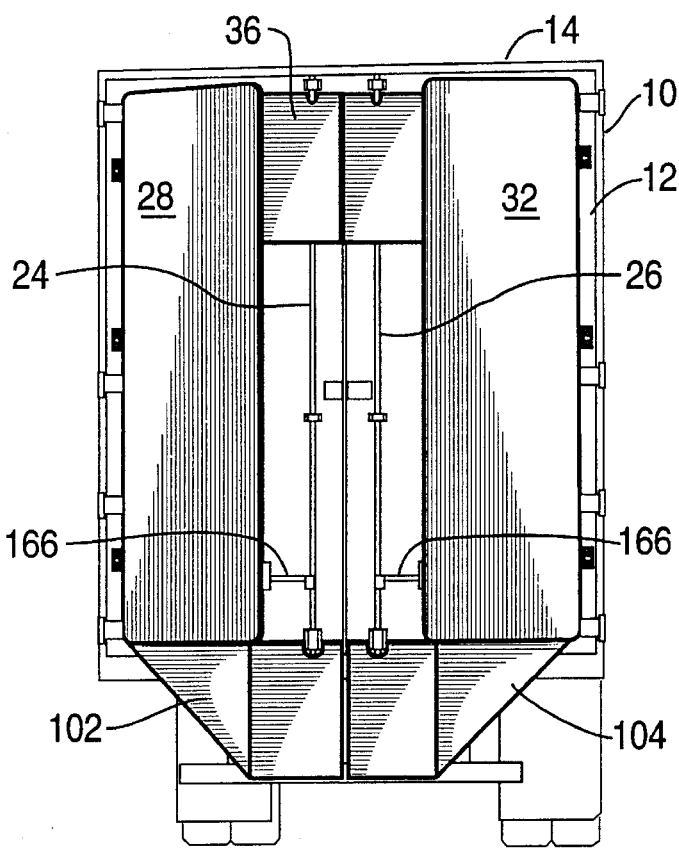
FIG. 11 is a plan view of an alternative embodiment of the present invention showing the apparatus of the present invention in the stored position.
Figure 12:
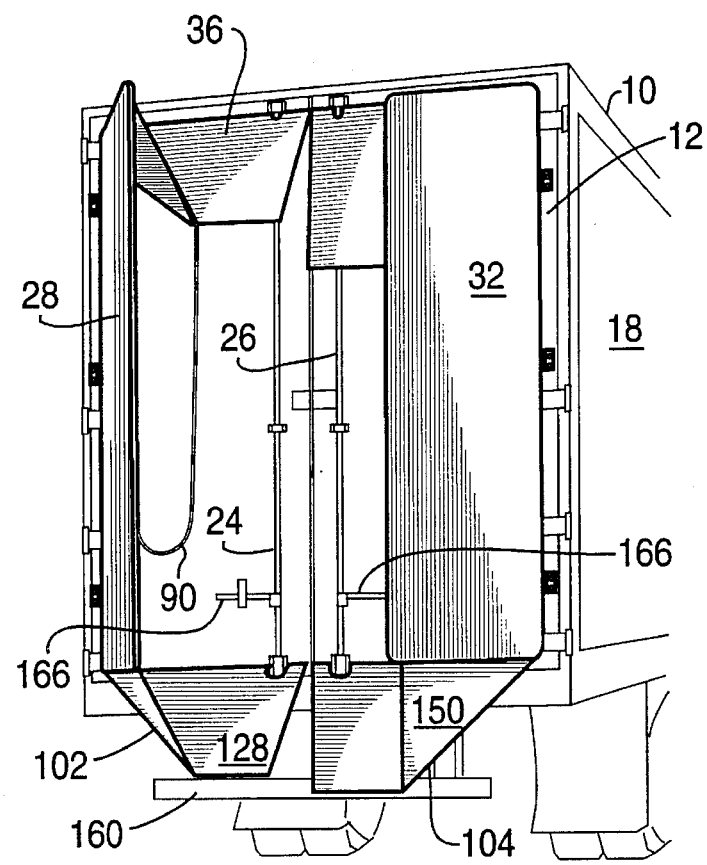
FIG. 12 is a plan view of the alternative embodiment shown in FIG. 11 in the partially deployed position.

With the configuration of the third frame means 108 and the fourth frame means 129, when stored they can preferably extend downwardly as shown in FIG. 11. With this configuration the locking bar handles used on many conventional trailer body configurations can be fully operational for rotation thereof even with the apparatus of the present invention in the stored position. Normally, frames 108 and 129 will extend downwardly adjacent the bumper bar 160 often found on conventional trailer body designs.

With this configuration including the third and fourth frame means 108 and 129, the drag reducing apparatus of the present invention can be fully automatic. That is, deployment of only the first vertical panel 28 and the second vertical panel 32 will achieve full deployment. The deployment of these two panel can also be controlled by a remote activation means, possibly positioned within the driver's compartment, which can be electrically powered such as a solenoid control system. Of course, the two vertical panels can be manually deployed which will still fully deploy the entire drag reducing apparatus of the present invention.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An improved apparatus for reducing drag at the trailing end of a moving body having a top surface, a first side surface, a second side surface and a trailing end, said improved apparatus comprising:

A. a first vertical panel means pivotally attached with respect to the trailing end of the body, said first vertical panel means extending generally vertically along the trailing end of the body and being pivotally movable to a deployed position extending generally outwardly therefrom approximately parallel with respect to the first side surface of the body;

B. a second vertical panel means pivotally attached with respect to the trailing end of the body at a position spatially disposed from said first vertical panel means to define a dead space area therebetween, said second vertical panel means extending generally vertically along the trailing end of the body and being pivotally movable to a deployed position extending generally outwardly therefrom approximately parallel with respect to the second side surface of the body;

C. a first horizontal panel means pivotally movably attached with respect to the trailing end of a body and with respect to said first vertical panel means to be automatically deployed responsive to deployment of said first vertical panel means, said first horizontal panel means being pivotally moveable to a deployed position extending outwardly from the trailing edge of the body approximately parallel with respect to the top surface and between said first vertical panel means and said second vertical panel means to define a dead space area therebelow, said first horizontal panel means comprising:

(1) a first frame means pivotally mounted with respect to the trailing end of a body and comprising:

(a) a first inner rib means pivotally attached with respect to the trailing end of the body and extendable outwardly therefrom to a deployed position approximately perpendicularly thereto;

(b) a first outer rib means pivotally attached with respect to the trailing end of the body at a position spatially disposed from said first inner rib means, said first outer rib means being extendable outwardly to a deployed position angularly oriented with respect to the trailing end of the body being angled toward said first inner rib means;

(c) a first cross strut means secured to said first inner rib means and extending laterally outwardly therefrom toward said first outer rib means and being secured thereto;

(2) a first link means pivotally attached with respect to said first vertical panel means and pivotally secured to said first frame means to facilitate movement of said first frame means to the deployed position;

(3) a first covering means attached with respect to said first vertical panel means and the trailing end of the body and being attached to and extending over said first frame means to extend approximately horizontally responsive to said first horizontal panel means being in the deployed position; and D. a second horizontal panel means positionable extending between said first vertical panel means and said second vertical panel means at a position below said first horizontal panel means to define a dead space area therebetween.

2. An improved apparatus for reducing drag at the trailing end of a moving body having a top surface, a first side surface, a second side surface and a trailing end as defined in claim 1 wherein said first covering means includes a first covering section which comprises said first link means and is pivotally connected to said first vertical panel means and is pivotally connected to said first frame means to facilitate movement of said first frame means to the deployed position responsive to movement of said first vertical panel means to the deployed position.

3. An improved apparatus for reducing drag at the trailing end of a moving body having a top surface, a first side surface, a second side surface and a trailing end as defined in claim 1 wherein said first link means comprises a first link arm means pivotally connected to said first vertical panel means and pivotally connected to said first frame means to facilitate movement of said first frame means to the deployed position responsive to movement of said first vertical panel means to the deployed position.

4. An improved apparatus for reducing drag at the trailing end of a moving body having a top surface, a first side surface, a second side surface and a trailing end as defined in claim 1 wherein said first horizontal panel means further comprises:

(1) a second frame means pivotally mounted with respect to the trailing end of a body and with respect to said second vertical panel means to be automatically deployed responsive to deployment of said second vertical panel means which comprises:

(a) a second inner rib means pivotally attached with respect to the trailing end of the body and extendable outwardly therefrom to a deployed position approximately perpendicularly thereto;

(b) a second outer rib means pivotally attached with respect to the trailing end of the body at a position spatially disposed from said second inner rib means, said second outer rib means being extendable outwardly to a deployed position angularly oriented with respect to the trailing end of the body being angled toward said second inner rib means;

(c) a second cross strut means secured to said second inner rib means and extending laterally outwardly therefrom toward said second outer rib means and being secured thereto;

(2) a second link means pivotally attached with respect to said second vertical panel means and pivotally secured to said second frame means to facilitate movement of said second frame means to the deployed position; and (3) a second covering means attached with respect to said second vertical panel means and the trailing end of the body and being attached to and extending over said second frame means to extend approximately horizontally responsive to said second horizontal panel means being in the deployed position.

5. An improved apparatus for reducing drag at the trailing end of a moving body having a top surface, a first side surface, a second side surface and a trailing end as defined in claim 4 wherein said second covering means includes a second covering section which comprises said second link means and is pivotally connected to said second vertical panel means and is pivotally connected to said second frame means to facilitate movement of said second frame means to the deployed position responsive to movement of said second vertical panel means to the deployed position.

6. An improved apparatus for reducing drag at the trailing end of a moving body having a top surface, a first side surface, a second side surface and a trailing end as defined in claim 4 wherein said second link means comprises a second link arm means pivotally connected to said second vertical panel means and pivotally connected to said second frame means to facilitate movement of said second frame means to the deployed position responsive to movement of said second vertical panel means to the deployed position.

7. An improved apparatus for reducing drag at the trailing end of a moving body having a top surface, a first side surface, a second side surface and a trailing end as defined in claim 1 wherein said first outer rib means is angularly oriented with respect to said first vertical panel means in the deployed position at approximately forty-five degrees with respect thereto to facilitate movement thereof to the deployed position.

8. An improved apparatus for reducing drag at the trailing end of a moving body having a top surface, a first side surface, a second side surface and a trailing end as defined in claim 1 further comprising a first inner spring biasing means connected with respect to said first inner rib means to urge movement thereof to the deployed position approximately parallel to the top surface.

9. An improved apparatus for reducing drag at the trailing end of a moving body having a top surface, a first side surface, a second side surface and a trailing end as defined in claim 1 further comprising a first outer spring biasing means connected with respect to said first outer rib means to urge movement thereof to the deployed position approximately parallel to the top surface.

10. An improved apparatus for reducing drag at the trailing end of a moving body having a top surface, a first side surface, a second side surface and a trailing end as defined in claim 4 further comprising a second inner spring biasing means connected with respect to said second inner rib means to urge movement thereof to the deployed position approximately parallel to the top surface.

11. An improved apparatus for reducing drag at the trailing end of a moving body having a top surface, a first side surface, a second side surface and a trailing end as defined in claim 4 further comprising a second outer spring biasing means connected with respect to said second outer rib means to urge movement thereof to the deployed position approximately parallel to the top surface.

12. An improved apparatus for reducing drag at the trailing end of a moving body having a top surface, a first side surface, a second side surface and a trailing end as defined in claim 1 wherein said first vertical panel means is horizontally movable from a storage position adjacent said trailing end of the body to a deployed position extending generally perpendicularly outwardly therefrom.

13. An improved apparatus for reducing drag at the trailing end of a moving body having a top surface, a first side surface, a second side surface and a trailing end as defined in claim 1 wherein said second vertical panel means is horizontally movable from a storage position adjacent said trailing end of the body to a deployed position extending generally perpendicularly outwardly therefrom.

14. An improved apparatus for reducing drag at the trailing end of a moving body having a top surface, a first side surface, a second side surface and a trailing end as defined in claim 1 wherein said first frame means further includes a first mounting arm means fixedly mounted with respect to said first inner rib means and said first outer rib means and pivotally mounted with respect to the trailing end of the body to facilitate pivotal movement of said first frame means with respect to the trailing end of the body.

15. An improved apparatus for reducing drag at the trailing end of a moving body having a top surface, a first side surface, a second side surface and a trailing end as defined in claim 14 wherein the trailing end of the moving body includes a first door with a first locking bar rotatably mounted thereto and extending vertically thereon and wherein said first mounting arm means comprises an inside first mounting arm section and an outside first mounting arm section spatially disposed from one another with the first locking bar positioned therebetween to facilitate rotational movement thereof.

16. An improved apparatus for reducing drag at the trailing end of a moving body having a top surface, a first side surface, a second side surface and a trailing end as defined in claim 4 wherein said second frame means further includes a second mounting arm means fixedly mounted with respect to said second inner rib means and said second outer rib means and pivotally mounted with respect to the trailing end of the body to facilitate pivotal movement of said second frame means with respect to the trailing end of the body.

17. An improved apparatus for reducing drag at the trailing end of a moving body having a top surface, a first side surface, a second side surface and a trailing end as defined in claim 16 wherein the trailing end of the moving body includes a second door with a second locking bar rotatably mounted thereto and extending vertically thereon and wherein said second mounting arm means comprises an inside second mounting arm section and an outside second mounting arm section spatially disposed from one another with the second locking bar positioned therebetween to facilitate rotational movement thereof.

18. An improved apparatus for reducing drag at the trailing end of a moving body having a top surface, a first side surface, a second side surface and a trailing end as defined in claim 1 wherein said second horizontal panel means is pivotally secured with respect to said second vertical panel means and engageable with respect to said first vertical panel means to be retained in the deployed position extending approximately horizontally between said first vertical panel means and said second vertical panel means with a dead air space being defined thereabove.

19. An improved apparatus for reducing drag at the trailing end of a moving body having a top surface, a first side surface, a second side surface and a trailing end as defined in claim 18 wherein said first vertical panel means includes a stud means extending outwardly therefrom and wherein said second horizontal panel means includes an engagement aperture defined therein positionable upon said stud means to retain said second horizontal panel means in the deployed position extending generally horizontally between said first vertical panel means and said second vertical panel means with a dead air space defined thereabove.

20. An improved apparatus for reducing drag at the trailing end of a moving body having a top surface, a first side surface, a second side surface and a trailing end as defined in claim 18 wherein said second horizontal panel means is pivotable away from the deployed position into abutment extending along said second vertical panel means to facilitate storage thereof.

21. An improved apparatus for reducing drag at the trailing end of a moving body having a top surface, a first side surface, a second side surface and a trailing end as defined in claim 1 wherein said first cross strut means extends approximately parallel to the trailing end of the body.

22. An improved apparatus for reducing drag at the trailing end of a moving body having a top surface, a first side surface, a second side surface and a trailing end as defined in claim 18 wherein said first cross strut means extends approximately parallel with respect to said first mounting arm means and is spatially disposed therefrom.

23. An improved apparatus for reducing drag at the trailing end of a moving body having a top surface, a first side surface, a second side surface and a trailing end as defined in claim 1 wherein said second cross strut means extends approximately parallel to the trailing end of the body.

24. An improved apparatus for reducing drag at the trailing end of a moving body having a top surface, a first side surface, a second side surface and a trailing end as defined in claim 16 wherein said second cross strut means extends approximately parallel with respect to said second mounting arm means and is spatially disposed therefrom.

25. An improved apparatus for reducing drag at the trailing end of a moving body having a top surface, a first side surface, a second side surface and a trailing end as defined in claim 14 wherein said first mounting arm means, said first inner rib means, said first outer rib means and said first cross strut means are integrally formed with respect to one another.

26. An improved apparatus for reducing drag at the trailing end of a moving body having a top surface, a first side surface, a second side surface and a trailing end as defined in claim 16 wherein said second mounting arm means, said second inner rib means, said second outer rib means and said second cross strut means are integrally formed with respect to one another.

27. An improved apparatus for reducing drag at the trailing end of a moving body having a top surface, a first side surface, a second side surface and a trailing end as defined in claim 1 wherein said first link means is pivotally secured with respect to said first frame means by pivotally moveable connection with respect to said first outer rib means.

28. An improved apparatus for reducing drag at the trailing end of a moving body having a top surface, a first side surface, a second side surface and a trailing end as defined in claim 1 wherein said first link arm means is pivotally secured with respect to said first frame means by pivotally moveable connection with respect to said first outer rib means.

29. An improved apparatus for reducing drag at the trailing end of a moving body having a top surface, a first side surface, a second side surface and a trailing end as defined in claim 4 wherein said second link arm means is pivotally secured with respect to said second frame means by pivotally moveable connection with respect to said second outer rib means.

30. An improved apparatus for reducing drag at the trailing end of a moving body having a top surface, a first side surface, a second side surface and a trailing end as defined in claim 4 wherein said second link arm means is pivotally secured with respect to said second frame means by pivotally moveable connection with respect to said second outer rib means.

31. An improved apparatus for reducing drag at the trailing end of a moving body having a top surface, a first side surface, a second side surface and a trailing end as defined in claim 1 further comprising a first release cord means connected to said first frame means and attached to an intermediate location on said first vertical panel means to facilitate downward movement of said first horizontal panel means from the deployed position.

32. An improved apparatus for reducing drag at the trailing end of a moving body having a top surface, a first side surface, a second side surface and a trailing end as defined in claim 4 further comprising a second release cord means connected to said second frame means and attached to an intermediate location on said second vertical panel means to facilitate downward movement of said second horizontal panel means from the deployed position.

33. An improved apparatus for reducing drag at the trailing end of a moving body having a top surface, a first side surface, a second side surface and a trailing end as defined in claim 14 wherein said first mounting arm means, said first inner rib means, said first cross strut means and said first out rib means form a trapezoidal shape to facilitate movement of said first horizontal panel means to the deployed position extending approximately parallel with respect to the top surface of the body.

34. An improved apparatus for reducing drag at the trailing end of a moving body having a top surface, a first side surface, a second side surface and a trailing end as defined in claim 16 wherein said second mounting arm means, said second inner rib means, said second cross strut means and said second out rib means form a trapezoidal shape to facilitate movement of said second horizontal panel means to the deployed position extending approximately parallel with respect to the top surface of the body.

35. An improved apparatus for reducing drag at the trailing end of a moving body having a top surface, a first side surface, a second side surface and a trailing end as defined in claim 1 wherein said second vertical panel means defines an interior recess therein adapted to receive said first horizontal panel means positioned therein responsive to pivotal movement of said horizontal panel means from the deployed position to a position extending along said second vertical panel means extending therealong.

36. An improved apparatus for reducing drag at the trailing end of a moving body having a top surface, a first side surface, a second side surface and a trailing end as defined in claim 4 wherein said first inner rib means is positioned extending outwardly from the trailing end immediately adjacent and parallel to said second inner rib means to facilitate positioning said first horizontal panel extending from said first vertical panel means to said second vertical panel means.

37. An improved apparatus for reducing drag at the trailing end of a moving body having a top surface, a first side surface, a second side surface and a trailing end as defined in claim 1 wherein said first covering means includes a first outer rib sleeve extending over said first outer rib means to facilitate movement of said first covering means therewith.

38. An improved apparatus for reducing drag at the trailing end of a moving body having a top surface, a first side surface, a second side surface and a trailing end as defined in claim 25 wherein said second covering means includes a second outer rib sleeve extending over said second outer rib means to facilitate movement of said second covering means therewith.

39. An improved apparatus for reducing drag at the trailing end of a moving body having a top surface, a first side surface, a second side surface and a trailing end as defined in claim 1 wherein said second horizontal panel means includes a first lower horizontal panel section pivotally secured to said first vertical panel means and a second lower horizontal panel section pivotally secured to said second vertical panel section, said first lower horizontal panel section and said second lower horizontal panel section being engageable with respect to one another at a position between said first vertical panel means and said second vertical panel means to form said second horizontal panel means therebetween.

40. An improved apparatus for reducing drag at the trailing end of a moving body having a top surface, a first side surface, a second side surface and a trailing end as defined in claim 39 further comprising a central interlocking means adapted to engage said first horizontal panel section with respect to said second horizontal panel section.

41. An improved apparatus for reducing drag at the trailing end of a moving body having a top surface, a first side surface, a second side surface and a trailing end as defined in claim 1 further comprising a first auxiliary spring biasing means mounted with respect to said first link arm means and said first frame means for biasing thereof toward the deployed position.

42. An improved apparatus for reducing drag at the trailing end of a moving body having a top surface, a first side surface, a second side surface and a trailing end as defined in claim 1 further comprising a second auxiliary spring biasing means mounted with respect to said second link arm means and said second frame means for biasing thereof toward the deployed position.

43. An improved apparatus for reducing drag at the trailing end of a moving body having a top surface, a first side surface, a second side surface and a trailing end as defined in claim 1 wherein said second horizontal panel means further comprises:
  (1) a third frame means pivotally mounted with respect to the trailing end of a body and comprising:
    (a) a third inner rib means pivotally attached with respect to the trailing end of the body and extendable outwardly therefrom to a deployed position approximately perpendicularly thereto;
    (b) a third outer rib means pivotally attached with respect to the trailing end of the body at a position spatially disposed from said third inner rib means, said third outer rib means being extendable outwardly to a deployed position angularly oriented with respect to the trailing end of the body being angled toward said third inner rib means;
    (c) a third cross strut means secured to said third inner rib means and extending laterally outwardly therefrom toward said third outer rib means and being secured thereto;
  (2) a third link means pivotally attached with respect to said third vertical panel means and pivotally secured to said third frame means to facilitate movement of said third frame means to the deployed position; and
  (3) a third covering means of flexible material attached with respect to said third vertical panel means and the trailing end of the body and being attached to and extending over said third frame means to extend approximately horizontally responsive to said third horizontal panel means being in the deployed position.

44. An improved apparatus for reducing drag at the trailing end of a moving body having a top surface, a first side surface, a second side surface and a trailing end as defined in claim 43 wherein said third covering means includes a third covering section which comprises said third link means and is pivotally connected to said first vertical panel means and is pivotally connected to said third frame means to facilitate movement of said third frame means to the deployed position responsive to movement of said first vertical panel means to the deployed position.

45. An improved apparatus for reducing drag at the trailing end of a moving body having a top surface, a first side surface, a second side surface and a trailing end as defined in claim 43 wherein said third link means comprises a third link arm means pivotally connected to said first vertical panel means and pivotally connected to said third frame means to facilitate movement of said third frame means to the deployed position responsive to movement of said first vertical panel means to the deployed position.

46. An improved apparatus for reducing drag at the trailing end of a moving body having a top surface, a first side surface, a second side surface and a trailing end as defined in claim 43 wherein said second horizontal panel means further comprises:
  (1) a fourth frame means pivotally mounted with respect to the trailing end of a body and comprising:
    (a) a fourth inner rib means pivotally attached with respect to the trailing end of the body and extendable outwardly therefrom to a deployed position approximately perpendicularly thereto, said fourth inner rib means extend generally parallel to and adjacent said third inner rib means in the deployed position;
    (b) a fourth outer rib means pivotally attached with respect to the trailing end of the body at a position spatially disposed from said fourth inner rib means, said fourth outer rib means being extendable outwardly to a deployed position angularly oriented with respect to the trailing end of the body being angled toward said fourth inner rib means;
    (c) a fourth cross strut means secured to said fourth inner rib means and extending laterally outwardly therefrom toward said fourth outer rib means and being secured thereto;
  (2) a fourth link means pivotally attached with respect to said fourth vertical panel means and pivotally secured to said fourth frame means to facilitate movement of said fourth frame means to the deployed position; and
  (3) a fourth covering means of flexible material attached with respect to said fourth vertical panel means and the trailing end of the body and being attached to and extending over said fourth frame means to extend approximately horizontally responsive to said fourth horizontal panel means being in the deployed position.

47. An improved apparatus for reducing drag at the trailing end of a moving body having a top surface, a first side surface, a second side surface and a trailing end as defined in claim 46 wherein said fourth covering means includes a fourth covering section which comprises said fourth link means and is pivotally connected to said second vertical panel means and is pivotally connected to said fourth frame means to facilitate movement of said fourth frame means to the deployed position responsive to movement of said second vertical panel means to the deployed position.

48. An improved apparatus for reducing drag at the trailing end of a moving body having a top surface, a first side surface, a second side surface and a trailing end as defined in claim 46 wherein said fourth link means comprises a fourth link arm means pivotally connected to said second vertical panel means and pivotally connected to said fourth frame means to facilitate movement of said fourth frame means to the deployed position responsive to movement of said second vertical panel means to the deployed position.

49. An improved apparatus for reducing drag at the trailing end of a moving body having a top surface, a first side surface, a second side surface and a trailing end as defined in claim 43 further comprising a third spring biasing means attached to said third frame means for biasing thereof toward the deployed position.

50. An improved apparatus for reducing drag at the trailing end of a moving body having a top surface, a first side surface, a second side surface and a trailing end as defined in claim 46 further comprising a fourth spring biasing means attached to said fourth frame means for biasing thereof toward the deployed position.

51. An improved apparatus for reducing drag at the trailing end of a moving body having a top surface, a first side surface, a second side surface and a trailing end as defined in claim 45 further comprising a third auxiliary spring biasing means attached to said third frame means and said third link arm means to urge pivotal movement thereof to the deployed position.

52. An improved apparatus for reducing drag at the trailing end of a moving body having a top surface, a first side surface, a second side surface and a trailing end as defined in claim 48 further comprising a fourth auxiliary spring biasing means attached to said fourth frame means and said fourth link arm means to urge pivotal movement thereof to the deployed position.

53. An improved apparatus for reducing drag at the trailing end of a moving body having a top surface, a first side surface, a second side surface and a trailing end as defined in claim 1 wherein the trailing end of the moving body includes a first door with a first locking bar rotatably mounted thereto and extending vertically thereon and wherein said first covering means includes a first flexible area adjacent the first locking bar to facilitate storage of said first horizontal panel means thereadjacent by allowing said first flexible area to stretch over the first locking bar.

54. An improved apparatus for reducing drag at the trailing end of a moving body having a top surface, a first side surface, a second side surface and a trailing end as defined in claim 1 wherein said first covering means is made of a flexible material.

55. An improved apparatus for reducing drag at the trailing end of a moving body having a top surface, a first side surface, a second side surface and a trailing end as defined in claim 1 wherein the trailing end of the moving body includes a second door with a second locking bar rotatably mounted thereto and extending vertically thereon and wherein said second covering means includes a second flexible area adjacent the second locking bar to facilitate storage of said second horizontal panel means thereadjacent by allowing said first flexible area to stretch over the second locking bar.

56. An improved apparatus for reducing drag at the trailing end of a moving body having a top surface, a first side surface, a second side surface and a trailing end as defined in claim 4 wherein said second covering means is made of a flexible material.

57. An improved apparatus for reducing drag at the trailing end of a moving body having a top surface, a first side surface, a second side surface and a trailing end having a first door with a first locking bar rotatably mounted thereon extending vertically and a second door with a second locking bar rotatably mounted thereon extending vertically, said improved apparatus comprising:

A. a first vertical panel means pivotally attached with respect to the trailing end of the body, said first vertical panel means extending generally vertically along the trailing end of the body and being pivotally movable horizontally to a deployed position extending generally outwardly therefrom approximately parallel with respect to the first side surface of the body, said first vertical panel means including stud means extending upwardly therefrom;

B. a second vertical panel means pivotally attached with respect to the trailing end of the body at a position spatially disposed from said first vertical panel means to define a dead space area therebetween, said second vertical panel means extending generally vertically along the trailing end of the body and being pivotally movable horizontally to a deployed position extending generally outwardly therefrom approximately parallel with respect to the second side surface of the body;

C. a first horizontal panel means pivotally movably attached with respect to the trailing end of a body and with respect to said first vertical panel means, said first horizontal panel means being pivotally moveable to a deployed position extending outwardly from the trailing edge of the body approximately parallel with respect to the top surface and between said first vertical panel means and said second vertical panel means to define a dead space area therebelow, said first horizontal panel means comprising:

(1) a first frame means pivotally mounted with respect to the trailing end of a body and comprising:

(a) a first inner rib means pivotally attached with respect to the trailing end of the body and extendable outwardly therefrom to a deployed position approximately perpendicularly thereto;

(b) a first outer rib means pivotally attached with respect to the trailing end of the body at a position spatially disposed from said first inner rib means, said first outer rib means being extendable outwardly to a deployed position angularly oriented with respect to the trailing end of the body being angled toward said first inner rib means, said first outer rib means being oriented at approximately 45 degrees with respect to said first vertical panel means in the deployed position;

(c) a first cross strut means integral with respect to said first inner rib means and extending laterally outwardly therefrom toward said first outer rib means and being integral therewith;

(d) a first inner spring biasing means connected with respect to said first inner rib means to urge movement thereof to the deployed position approximately parallel to the top surface;

(e) a first outer spring biasing means connected with respect to said first outer rib means to urge movement thereof to the deployed position approximately parallel to the top surface;

(f) a first mounting arm means being integral with respect to said first inner rib means and said first outer rib means and pivotally mounted with respect to the trailing end of the body to facilitate pivotal movement of said first frame means with respect to the trailing end of the body, said first mounting arm means including an inside first mounting arm section and an outside first mounting arm section spatially disposed from one another with the first locking bar positioned therebetween to facilitate rotational movement thereof, said first mounting arm means extending generally parallel to said first cross strut means and spatially disposed therefrom, said first mounting arm means along with said first inner rib means, said first outer rib means and said first cross strut means forming a trapezoidal shape within said first frame means to facilitate movement of said first horizontal panel means to the deployed position extending generally parallel to the top surface;

(2) a first link arm means pivotally attached with respect to said first vertical panel means and pivotally secured to said first outer rib means of said first frame means and adapted to extend outwardly approximately perpendicular to said first vertical panel means responsive to said first frame means being in the deployed position;

(3) a first covering means of flexible material attached with respect to said first vertical panel means and the trailing end of the body and being attached to and extending over said first frame means to extend approximately horizontally responsive to said first horizontal panel means being in the deployed position;

(4) a second frame means pivotally mounted with respect to the trailing end of a body and comprising:

(a) a second inner rib means pivotally attached with respect to the trailing end of the body and extendable outwardly therefrom to a deployed position approximately perpendicularly thereto and extending parallel to and adjacent said first inner rib means to form said first horizontal panel means extending approximately horizontally above the dead space area;

(b) a second outer rib means pivotally attached with respect to the trailing end of the body at a position spatially disposed from said second inner rib means, said second outer rib means being extendable outwardly to a deployed position angularly oriented with respect to the trailing end of the body being angled toward said second inner rib means, said second outer rib means being oriented at approximately 45 degrees with respect to said second vertical panel means in the deployed position;

(c) a second cross strut means integral with respect to said second inner rib means and extending laterally outwardly therefrom toward said second outer rib means and being integral therewith;

(d) a second inner spring biasing means connected with respect to said second inner rib means to urge movement thereof to the deployed position approximately parallel to the top surface;

(e) a second outer spring biasing means connected with respect to said second outer rib means to urge movement thereof to the deployed position approximately parallel to the top surface;

(f) a second mounting arm means being integral with respect to said second inner rib means and said second outer rib means and pivotally mounted with respect to the trailing end of the body to facilitate pivotal movement of said second frame means with respect to the trailing end of the body, said second mounting arm means including an inside second mounting arm section and an outside second mounting arm section spatially disposed from one another with the second locking bar positioned therebetween to facilitate rotational movement thereof, said second mounting arm means extending generally parallel to said second cross strut means and spatially disposed therefrom, said second mounting arm means along with said second inner rib means, said second outer rib means and said second cross strut means forming a trapezoidal shape within said second frame means to facilitate movement of said first horizontal panel means to the deployed position extending generally parallel to the top surface;

(5) a second link arm means pivotally attached with respect to said second vertical panel means and pivotally secured to said second outer rib means of said second frame means and adapted to extend outwardly approximately perpendicular to said second vertical panel means responsive to said second frame means being in the deployed position;

(6) a second covering means of flexible material attached with respect to said second vertical panel means and the trailing end of the body and being attached to and extending over said second frame means to extend approximately horizontally responsive to said second horizontal panel means being in the deployed position;

D. a first release cord means connected to said first frame means and attached to an intermediate location on said first vertical panel means to facilitate downward movement of said first horizontal panel means from the deployed position responsive to exerting of a downwardly directed force on said first release cord means;

E. a second release cord means connected to said second frame means and attached to an intermediate location on said second vertical panel means to facilitate downward movement of said second horizontal panel means from the deployed position responsive to exerting of a downwardly directed force on said second release cord means; and F. a second horizontal panel means positionable extending between said first vertical panel means and said second vertical panel means at a position below said first horizontal panel means to define a dead space area therebetween, said second horizontal panel means being pivotally secured with respect to said second vertical panel means and defining an engagement aperture therein adapted to be positioned over said stud means of said first vertical panel means for detachable securement of said second horizontal panel means with respect to said first vertical panel means to facilitate said first horizontal panel means to be retained in the deployed position extending approximately horizontally between said first vertical panel means and said second vertical panel means with a dead air space being defined thereabove.

\* \* \* \* \*